US011192038B2

(12) United States Patent
Miyatake et al.

(10) Patent No.: US 11,192,038 B2
(45) Date of Patent: Dec. 7, 2021

(54) COVER

(71) Applicant: NINTENDO CO., LTD., Kyoto (JP)

(72) Inventors: Junichiro Miyatake, Kyoto (JP); Yuya Okazaki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 123 days.

(21) Appl. No.: 16/821,893

(22) Filed: Mar. 17, 2020

(65) Prior Publication Data

US 2021/0008459 A1    Jan. 14, 2021

(30) Foreign Application Priority Data

Jul. 9, 2019  (JP) .............. JP2019-127851

(51) Int. Cl.
*A63F 13/98* (2014.01)
*A63F 13/24* (2014.01)
*A45C 11/00* (2006.01)

(52) U.S. Cl.
CPC .............. *A63F 13/98* (2014.09); *A45C 11/00* (2013.01); *A63F 13/24* (2014.09); *A45C 2011/003* (2013.01); *A63F 2300/1043* (2013.01)

(58) Field of Classification Search
CPC ........... A63F 13/98; A63F 13/24; A45C 11/00
See application file for complete search history.

(56) References Cited

U.S. PATENT DOCUMENTS

2007/0227923 A1   10/2007  Kidakarn
2018/0275769 A1    9/2018  Ikeda et al.

FOREIGN PATENT DOCUMENTS

| CN | 108390981 A   | 8/2018  |
| EP | 2 533 129 A2  | 12/2012 |
| JP | 2018-160025 A | 10/2018 |

OTHER PUBLICATIONS

European Search Report dated Jul. 17, 2020 received in European Patent Application No. EP 20151420.5.
ROSENKRIEGER360: "snakebyte Xbox Controller Case & Game Kit", Youtube, Nov. 17, 2017, p. 1, Retrieved from the Internet: URL: https://www.youtube.com/watch?time_continue=53&v=XUcLp718W-4&feature=emb_logo [retrieved on Jul. 2, 2020].
Nintendo, "Nintendo DS Lite Instruction Booklet", Feb. 9, 2019, pp. 1-16, Retrieved from the Internet URL:https://web.archive.org/web/20190209180139if /https://www.nintendo.com.au/files/DS_Manuals/DSLiteInstructionBooklet.pdf, [retrieved on Jul. 2, 2020].

*Primary Examiner* — Yingchuan Zhang
(74) *Attorney, Agent, or Firm* — Scully, Scott, Murphy & Presser, P.C.

(57) ABSTRACT

A cover for housing a portable electronic device that includes: a first main surface formed in a rectangular shape, a second main surface formed in a rectangular shape on a side opposite to the first main surface, a peripheral edge surface that joins peripheral edge portions of the first main surface and the second main surface and has an upper edge surface, a lower edge surface, and a pair of side edge surfaces, at least one joystick that protrudes from the first main surface, operation portions that are provided on portions of the upper surface toward the pair of side edge surfaces and protrude toward the second main surface, and protruding portions that protrude from the second main surface and are located on the lower edge surface sides of the operation portions.

9 Claims, 21 Drawing Sheets

COVER

CROSS REFERENCE TO RELATED APPLICATION

This application claims priority from Japanese Patent Application No. 2019-127851 filed on Jul. 9, 2019, the content of which is incorporated herein by reference in its entirety.

TECHNICAL FIELD

The present disclosure relates to a cover in which a portable electronic device is housed.

BACKGROUND ART

JP 2018-160025A discloses a cover housing a smartphone, which is a portable electronic device. This cover includes: a plate-shaped first cover that covers a front surface of a flat smartphone; a plate-shaped second cover the covers a rear surface of the smartphone; and a connection portion that foldably connects the two covers.

JP 2018-160025A is an example of related art.

SUMMARY OF THE INVENTION

The above-described cover can be used in not only a smartphone, but also a portable game apparatus. However, depending on the portable game apparatus, an operation portion such as a joystick that significantly protrudes from the main surface of the game apparatus is included, and thus there is a problem in that the cover increases in size when an attempt is made to house the operation portion that significantly protrudes as well. Other than this problem, the cover is required to fit the shape of the game apparatus. Note that this kind of problem can occur not only in a game apparatus, but in all portable electronic devices. The present invention was made in order to solve this problem, and it is an object thereof to provide a cover that fits the shape of a portable electronic device.

1. First Cover

A first cover according to the present disclosure is a cover for housing a portable electronic device that includes: a first main surface formed in a rectangular shape, a second main surface formed in a rectangular shape on a side opposite to the first main surface, a peripheral edge surface that joins peripheral edge portions of the first main surface and the second main surface and has an upper edge surface, a lower edge surface, and a pair of side edge surfaces, at least one joystick that protrudes from the first main surface, operation portions that are provided on portions of the upper edge surface toward the pair of side edge surfaces and protrude toward the second main surface, and protruding portions that protrude from the second main surface and are located on the lower edge surface sides of the operation portions, the cover including: a front cover for covering the first main surface; a rear cover for covering the second main surface; and a connection portion that connects the front cover and the rear cover. The connection portion connects the front cover and the rear cover such that it is configured to enter a closed state in which the front cover is closed with respect to the rear cover so as to form an inner space in which the portable electronic device is housed, and an open state in which the front cover is open with respect to the rear cover, the front cover includes an inner surface that opposes the first main surface in the closed state, and an outer surface on a side opposite to the inner surface, the inner surface of the front cover includes a recessed portion that is formed at a position corresponding to the joystick so as to cover at least a portion of the joystick in the closed state, the outer surface of the front cover includes a bulging portion that is formed at a position on a side opposite to the recessed portion and bulges, the rear cover includes: a first base portion for covering the second main surface; and extended portions that extend from a peripheral edge of the first base portion and are for covering the protruding portions from the lower edge surface side, and in the closed state, openings through which the operation portions are exposed to the outside are formed between the front cover and the rear cover.

With the first cover, a recessed portion is formed on the inner surface of the cover so as to cover at least a portion of the joystick, and therefore it is possible to suppress a case in which an unnecessary load acts on the joystick. On the other hand, on the outer surface of the cover, a bulging portion is formed so as to include the position on the side opposite to the recessed portion, and at least a portion of the outer surface other than the bulging portion is closer to the first main surface of the portable electronic device than the bulging portion. In this manner, the position of the front cover at which the joystick is provided does not bulge, and therefore it is possible to make the cover compact overall while avoiding a case in which an unnecessary load acts on the joystick. That is, it is possible to provide a cover that fits the shape of the portable electronic device.

Also, the protruding portions of the game apparatus can be protected by providing the extended portions that cover the protruding portions as described above. Also, by providing the extended portions, it is possible to easily see which cover is on the upper side.

Since the operation portions protrude from the second main surface of the portable electronic device, for example, if the front cover is provided so as to cover the operation portions as well, the front cover is more likely to catch on the operation portions when opened, and there is a risk that the front cover will be difficult to open. Also, although it is also conceivable to form the connection portion with an increased length in order to suppress interference with the operation portions when the front cover is opened, upon doing so, there is a risk that in the open state, the front cover will hang down significantly from the rear cover and will become a hindrance when operating the portable electronic device. In contrast to this, if openings are formed and the operation portions are exposed as described above, it is possible to suppress a case in which the front cover interferes with the operation portions, and it is possible to make it easier to open the front cover. Also, there is no need to increase the length of the connection portion, and it is possible to suppress deterioration of the operability of the portable electronic device.

Note that although the front cover mainly covers the first main surface, the main cover can also be configured to additionally cover the peripheral edge surface of the game apparatus. The same applies to the rear cover as well. Accordingly, there are cases in which the peripheral edge surface is covered by only the front cover, cases in which the peripheral edge surface is covered by only the rear cover, and cases in which the peripheral edge surface is covered by both the front cover and the rear cover. Also, as described above, in the closed state, the openings through which the operation portions are exposed are formed between the front cover and the rear cover. Also, the peripheral edge surface of the game apparatus is constituted by the upper edge surface, the lower edge surface, and the pair of side edge surfaces, but for example, it is also possible to form a corner portion such as a chamfered portion between the upper edge portion and one of the side wall surfaces. That is, it is sufficient that at least surfaces that can be identified as the upper edge surface, the lower edge surface, and the pair of side edge surfaces are provided in the outer shape. Note that if the corner surfaces are formed between the upper edge surface and the side wall surfaces and operation portions are formed at the corner surfaces, the corner surfaces at which the operation portions are formed are included in the upper edge surface.

In the above-described first cover, in the closed state, a gap can be formed between the inner surface of the front cover and the first main surface.

According to this configuration, a gap is formed between the inner surface of the front cover and the first main surface, and therefore, for example, it is possible to suppress a case in which an unnecessary load is applied by the front cover to the joystick, buttons, and display.

In the above-described first cover, the rear cover can include a first side wall portion that stands upright from the peripheral edge of the first base portion and is configured to contact at least portions of the lower edge surface and the pair of side edge surfaces on the peripheral edge surface of the portable electronic device, at least a portion of the first side wall portion is configured to hold at least portions of the lower edge surface and the pair of side wall surfaces, and in the closed state, the connection portion can be arranged at a position covering the upper edge surface of the portable electronic device.

According to this configuration, the portable electronic device can be fixed by the first side wall portion of the rear cover. In particular, if the lower edge surface of the portable electronic device comes into contact with the first side wall portion, or for example, if operation is performed with the lower edge surface of the portable electronic device facing downward in the vertical direction, it is possible to suppress a case in which the portable electronic device separates in a downward direction from the rear surface during operation. Furthermore, in the closed state, the connection portion is arranged at a position covering the upper edge surface of the portable electronic device. Accordingly, it is possible to also suppress separation of the portable electronic device from the upper edge portion of the cover.

Note that in the first base portion, it is also possible not to provide the wall portion at a location at which the first side wall portion is not standing, and for example, a wall portion that is lower than the first side wall portion can also be provided. That is, for example, the wall portion need not be provided on the upper edge surface side of the peripheral edge surface of the portable electronic device, or only the first base portion may be extended. Alternatively, a wall portion that is lower than the first side wall portion may be provided.

In the above-described first cover, the front cover can include: a plate-shaped second base portion for covering the first main surface of the portable electronic device; and a second side wall portion that stands upright from the peripheral edge of the second base portion and is for covering at least portions of the lower edge surface and a pair of side edge surfaces of the peripheral edge surface of the portable electronic device. In the closed state, a leading end surface of the side wall portion of the rear cover and a leading end surface of the second side wall portion of the front cover can come into contact with each other.

According to this configuration, the leading end surfaces of the side wall portions of the two covers are configured to come into contact with each other, and therefore the cover can be easily put in the closed state. Note that, for example, if the cover is covered by the sheet material, the leading end surfaces covered by the sheet material come into contact with each other. Thus, it can be said that the leading end surfaces come into contact with each other even if an interposing object such as a sheet material is present between the leading end surfaces.

In the above-described first cover, the cover can include a notch portion in the first side wall of the rear cover. The notch portion may be disposed in a portion opposing the lower edge surface and where a speaker hole of the portable electronic device is located.

According to this configuration, the speaker hole is to be exposed to the outside in the open state by the notch portion. For this reason, a case in which the speaker hole is closed by the side wall portion can be suppressed, and since the speaker hole is exposed to the outside via the notch portion in the open state, it is possible to make it easier to hear sound output from the speaker hole.

In the above-described first cover, the first side wall portion of the rear cover can include a pair of side edge portions that oppose the pair of side edge surfaces and a lower edge portion that opposes the lower edge surface, and the side edge portion can be thinner than the lower edge portion, near the approximate center in the upright direction of the first side wall portion.

According to this configuration, the following effects can be obtained. For example, if the portable electronic device is a game apparatus, the cover is opened and a game is played while the game apparatus is still housed in the cover in some cases. In this case, the user grips the two side edge surfaces of the game apparatus via the side edge portions of the first side wall portion. At this time, if the side edge portions are too thick, there is a risk that the user will feel discomfort. In view of this, discomfort can be suppressed by making the side edge portions thinner than the lower edge portion, and the game apparatus can be stably supported from below by making the lower edge portion relatively thicker.

In the above-described cover, the front cover can be made thicker than the first base portion of the rear cover.

According to this configuration, the following effects can be obtained. Since the portable electronic device is fixed at the first base portion of the rear cover, deformation is unlikely to occur, but in at least the open state, the second base portion of the front cover does not come into contact with the portable electronic device, and therefore there is a risk that deformation will occur. In view of this, the second base portion of the front cover is made thicker than the first base portion of the rear cover, and thus a case is suppressed in which deformation occurs. On the other hand, even if the first base portion of the rear cover is thin, deformation is not likely to occur. Accordingly, the first base portion of the rear cover may be thinner than the second base portion of the front cover, and thus it is possible to achieve a reduction in weight.

More specifically, for example, the front cover can include: a second base portion for covering a first main surface of the portable electronic device; and a second side wall portion that stands upright from a peripheral edge of the second base portion, and is for covering at least portions of the lower edge surface and the pair of side edge surfaces on the peripheral edge surface of the portable electronic device, and the second base portion can be made thicker than the first base portion.

In the above-described first cover, the extended portions can protrude from the first base portion past leading end portions of the operation portions that protrude the most from the second main surface.

According to this configuration, in the state in which the portable electronic device is housed, the extended portion protrudes past the operation portions, and therefore when the rear cover is placed on a predetermined surface such as a desk, the extended portion comes into contact with the predetermined surface, and thus it is possible to suppress a case in which the operation portions come into contact therewith. Accordingly, it is possible to suppress a case in which an unnecessary load is applied to the operation portions.

2. Second Cover

A second cover according to the present disclosure is configured as described below.

A cover for housing a portable electronic device including: a first main surface formed into a rectangular shape, a second main surface formed into a rectangular shape on a side opposite to the first main surface, and a peripheral edge surface that joins peripheral edge portions of the first main surface and the second main surface and has an upper edge surface, a lower edge surface, and a pair of side edge surfaces, the cover includes:

a front cover for covering the first main surface;

a rear cover for covering the second main surface; and a connection portion that connects the front cover and the rear cover.

The connection portion connects the front cover and the rear cover such that it is possible to enter a closed state in which the front cover is closed with respect to the rear cover so as to form an inner space in which the portable electronic device can be housed, and an open state in which the front cover is open with respect to the rear cover, the rear cover includes a first base portion for covering the second main surface of the portable electronic device, and a first side wall portion that stands upright from a peripheral edge of the first base portion and can come into contact with at least a portion of the lower edge surface and the pair of side edge surfaces on the peripheral edge surface of the portable electronic device, at least a portion of the first side wall portion can engage with at least portions of the lower edge surface and the pair of side wall surfaces, and in the closed state, the connection portion is arranged at a position covering the upper edge surface of the portable electronic device.

With the second cover, the portable electronic device can be fixed by the first side wall portion of the rear cover. In particular, if the lower edge surface of the portable electronic device comes into contact with the first side wall portion, or for example, if operation is performed with the lower edge surface of the portable electronic device facing downward in the vertical direction, it is possible to suppress a case in which the portable electronic device separates in a downward direction from the rear surface during operation. Furthermore, in the closed state, the connection portion is arranged at a position covering the upper edge surface of the portable electronic device. Accordingly, it is possible to also suppress separation of the portable electronic device from the upper edge portion of the cover. As described above, the second cover according to the present disclosure fits the shape of the portable electronic device.

In the above-described second cover, the first side wall portion of the rear cover can include a pair of side edge portions that oppose the pair of side edge surfaces and a lower edge portion that opposes the lower edge surface, and the side edge portion can be made thinner than the lower edge portion, near the approximate center in the upright direction of the first side wall portion.

In the above-described second cover, the front cover can include:

a second base portion for covering the first main surface of the portable electronic device; and a second side wall portion that stands upright from a peripheral edge of the second base portion, and is for covering at least portions of the lower edge surface and the pair of side edge surfaces on the peripheral edge surface of the portable electronic device, and in the closed state, a leading end surface of the first side wall portion of the rear cover and a leading end surface of the second side wall portion of the front cover can come into contact with each other.

With the above-described second cover, at least one first notch that is open at the leading end surface of the first side wall surface can be formed at a portion opposing the lower edge surface of the portable electronic device on the first side wall portion of the rear cover.

In the second cover, a pair of the notch portions can be formed symmetrically on the first side wall portion.

Second notch portions into which magnets are fit can be formed in the first side wall portion on the second cover.

In the above-described second cover, the front cover can include a second base portion for covering the first main surface of the portable electronic device, and the second base portion of the front cover can be thicker than the first base portion of the rear cover.

3. Third Cover

A third cover according to the present disclosure is configured as described below.

A cover for housing a portable electronic device including: a first main surface formed into a rectangular shape, a second main surface formed into a rectangular shape on a side opposite to the first main surface, and a peripheral edge surface that joins the peripheral edge portions of the first main surface and the second main surface and has an upper edge surface, a lower edge surface, and a pair of side edge surfaces, the cover includes:

a front cover for covering the first main surface;

a rear cover for covering the second main surface; and a connection portion that connects the front cover and the rear cover.

The connection portion connects the front cover and the rear cover such that it is possible to enter a closed state in which the front cover is closed with respect to the rear cover so as to form an inner space in which the portable electronic device can be housed, and an open state in which the front cover is open with respect to the rear cover, the rear cover includes a first base portion for covering the second main surface, and a pair of extended portions that extend from a peripheral edge of the first base portion on a side opposite to the front cover in the closed state, and openings are formed between the front cover and the rear cover in the closed state at locations corresponding to the extended portions.

The above-described third cover fits the shape of the portable electronic device.

In the above-described third cover, the front cover can include an inner surface that is formed into a plate shape and opposes the first main surface in the closed state, and an outer surface on a side opposite to the inner surface, the inner surface of the front cover can include at least one recessed portion, and the outer surface of the front cover can include a bulging portion that is formed at a portion corresponding to the recessed portion and bulges so as to conform to the recessed portion.

In the above-described cover, the rear cover can include
a first base portion for covering the second main surface of the portable electronic device, and
a first side wall portion that stands upright from the peripheral edge of the first base portion and opposes the peripheral edge surface of the portable electronic device, and
in the first side wall portion of the rear cover, at least one notch portion that is open at the leading end surface of the first side wall surface can be formed at a portion opposing the lower edge surface of the portable electronic device.

Second notch portions into which magnets are fit can be formed at the first side wall portion in the above-described third cover.

4. Fourth Cover

As described above, although the cover disclosed in Patent Document has conventionally been proposed, in recent years, there has been demand not only to simply house a portable electronic device, but also for designability. In view of this, a fourth cover according to the present disclosure aims to make it possible to easily adapt to a desired design.

The fourth cover according to the present disclosure is configured as described below.

A cover for housing a portable electronic device including: a first main surface, a second main surface formed into a rectangular shape on a side opposite to the first main surface, and a peripheral edge surface that joins peripheral edge portions of the first main surface and the second main surface, the cover includes:
a front cover for covering the first main surface;
a rear cover for covering the first main surface; and
a connection portion that connects the front cover and the rear cover.

The rear portion connects the front cover and the rear cover such that it is possible to enter a closed state in which the front cover is closed relative to the rear cover so as to form an inner space in which the portable electronic device can be housed, and an open state in which the front cover is open relative to the front cover such that the inner space can be open to the outside,
the front cover includes a front cover member,
the rear cover includes a rear cover member, and
the front cover and the rear cover are formed by covering at least portions of the front cover member and the rear cover member with a sheet material, and the connection portion is formed by a portion of the sheet material.

With the fourth cover, the front cover and the rear cover are formed due to at least portions of the front cover member and the rear cover member being covered by the sheet material, and therefore the design of the exterior of the front cover and the rear cover can be changed easily by merely changing the sheet material. Accordingly, it is possible to easily adapt to a desired cover design. Also, since the connection portion is formed by a portion of the sheet material, the connection portion easily deforms, and the front cover can be made easy to open.

In the above-described fourth cover, the rear cover member can include:
a plate-shaped first base portion for covering the second main surface of the portable electronic device; and
a first side wall portion that stands upright from a peripheral edge of the first base portion and can come into contact with at least a portion of the lower edge surface and the pair of side edge surfaces on the peripheral edge surface of the portable electronic device,
at least a portion of the first side wall portion can engage with at least portions of the lower edge surface and the pair of side wall surfaces, and
in the closed state, the connection portion can be arranged at a position covering the upper edge surface of the portable electronic device.

In the above-described fourth cover, the front cover member can include:
a second base portion for covering the first main surface of the portable electronic device; and
a second side wall portion that stands upright from the peripheral edge of the second base portion and covers at least portions of the lower edge surface and the pair of side edge surfaces on the peripheral edge surface of the portable electronic device, and
in the closed state, the leading end surface of the side wall portion of the rear cover and the leading end surface of the second side wall portion of the front cover can come into contact with each other via the sheet material.

In the above-described fourth cover, magnets can be provided in the leading end surface of the first side wall portion of the rear cover member, the magnets can be covered by the sheet material, magnets can be provided in the leading end surface of the second side wall portion of the front cover member, and the magnets can be covered by the sheet material.

In the above-described fourth cover, the sheet material can include:
an outer surface sheet that covers at least a portion of the outer surface of at least one of the front cover member and the rear cover member; and
an inner surface sheet that covers at least a portion of the inner surface of at least one of the front cover member and the rear cover member, and
the connection portion can be formed by stacking a portion of the outer surface sheet and a portion of the inner surface sheet.

In the above-described fourth cover, the inner surface sheet can be configured to cover only the inner surface of at least one of the front cover member and the rear cover member.

In the above-described fourth cover, the outer surface sheet is folded over at the edge portion of the outer surface of at least one of the front cover member and the rear cover member, and is folded over so as to extend to the inner surface, and the inner surface sheet can be formed so as to cover the outer surface sheet that extends to the inner surface.

In the above-described fourth cover, one location at which the outer surface sheet is covered by the inner surface sheet on the inner surfaces of the front cover member and the rear cover member can be recessed more than another second location, and the second location and the outer sheet arranged at the first location can be level with each other.

In the above-described fourth cover, the sheet material can include:
a first outer surface sheet that covers at least the outer surface of the front cover member;
a second outer surface sheet that covers at least the outer surface of the rear cover member; and
an inner surface sheet that covers the inner surface of the front cover member and the rear cover member, the connection portion can be formed due to a portion of the first outer surface sheet being extended, and the extended portion can be fixed to the inner surface of the rear cover member, and the inner surface sheet can be configured to cover the portion of the first outer surface sheet fixed to the rear cover member.

According to this configuration, the following effects can be obtained.

Since the first outer surface sheet is extended not to the outer surface but to the inner surface of the rear cover member and fixed, the appearance of the rear cover improves. Also, an advantage is obtained in that when the portable electronic device is operated in the open state, the user gripping the rear cover is not likely to touch the first outer surface sheet, and thus the texture improves.

The first outer surface sheet that reaches the inner surface of the rear cover member is covered by the inner surface sheet that integrally covers the front cover and the rear cover, and therefore the exterior of the inner surface looks to be in one piece.

Since the connection portion, which is the extended portion of the first outer surface sheet, is fixed with the rear cover member, when the cover is opened, the rear cover side acts as a fulcrum, and the rear cover easily hangs down from this fulcrum. Accordingly, an advantage is obtained in that it is easy for the user to operate the portable electronic device. It is thought that if the second outer surface sheet is extended and fixed on the inner surface of the front cover member, the portion fixed to the front cover member will function as a fulcrum. For this reason, it is thought that, first, the front cover is opened using the fulcrum as an axis, and due to the front cover being pivoted further, the front cover is opened with the rear cover and the connection portion eventually becoming one piece. For this reason, it is thought that there is a risk that the front cover will be difficult to open, and the front cover will try to close or become unstable during operation of the portable electronic device.

The above-described first cover can fit the shape of the portable electronic device.

EMBODIMENTS OF THE INVENTION

Hereinafter, a cover for housing a portable electronic device according to the present disclosure will be described with reference to the drawings. First, a game apparatus 1, which is one embodiment of a portable electronic device according to the present disclosure will be described, and thereafter a cover 2 for housing the game apparatus 1 will be described.

1. Overview of Game Apparatus

Figure 1:
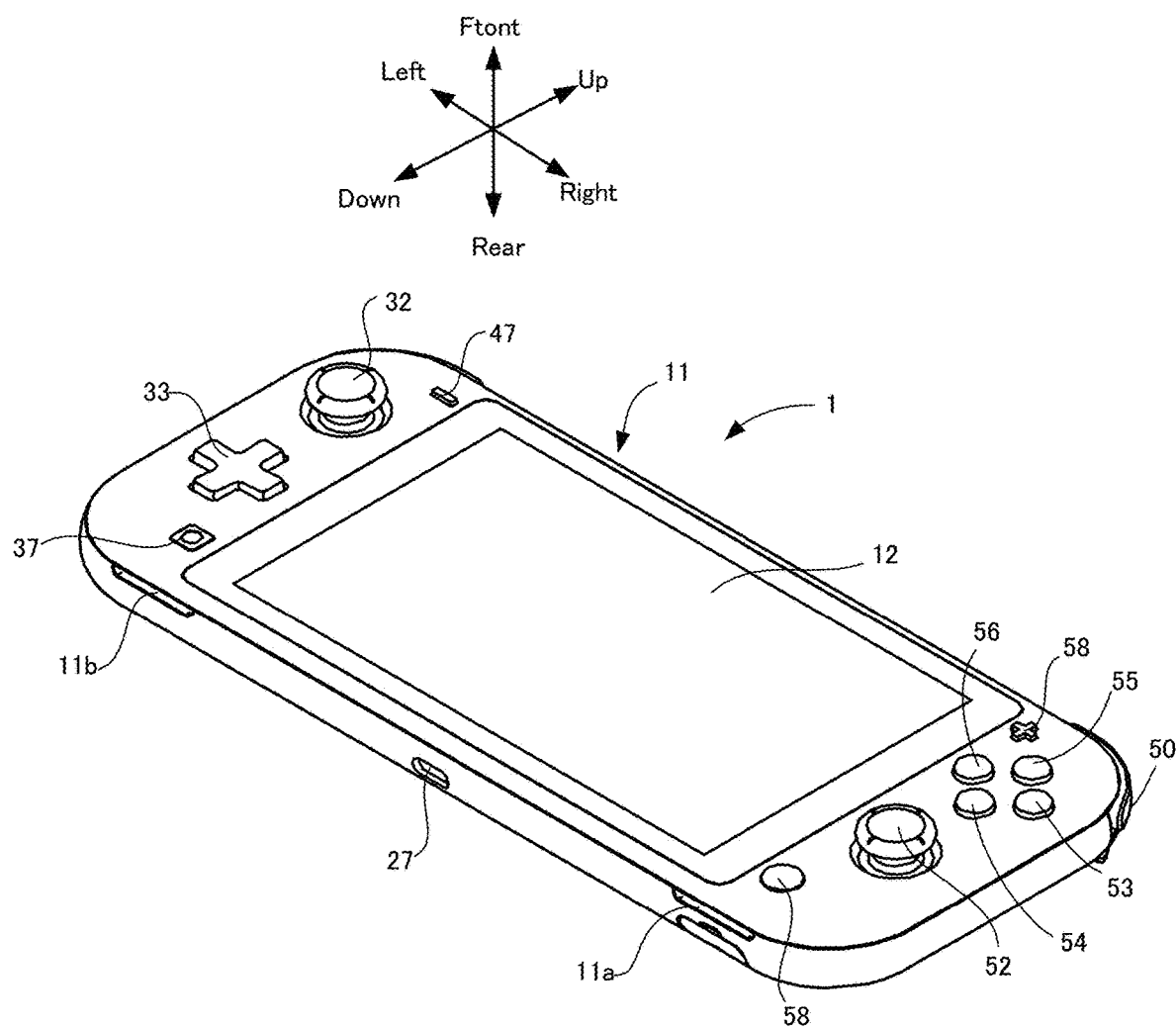
FIG. 1 is a perspective view of a game apparatus, which is a first embodiment of the portable electronic device according to the present disclosure, as viewed from a front side.

Hereinafter, a game apparatus according to an example of the present embodiment will be described. FIG. 1 is a perspective view of the game apparatus as viewed from the front side, FIG. 2 is a perspective view of the game apparatus as viewed from a rear side, and FIG. 3 is a diagram of six surfaces of the game apparatus.

Figure 2:
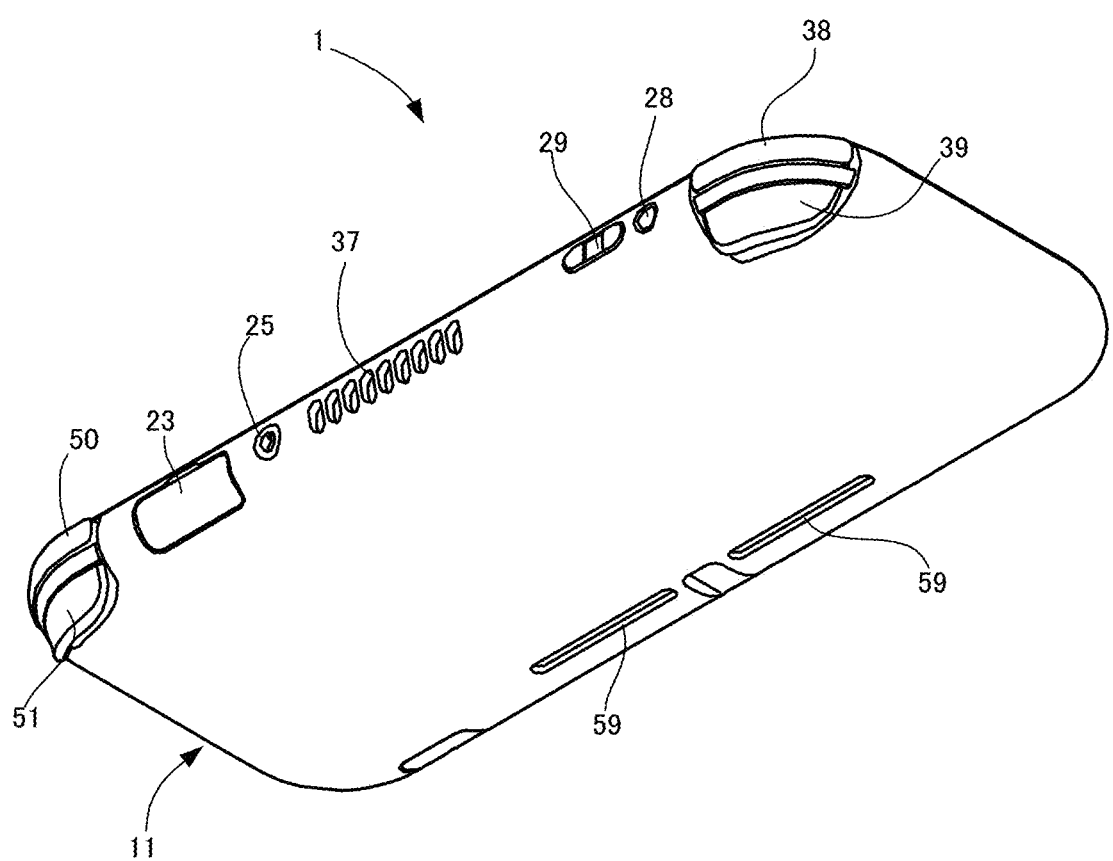
FIG. 2 is a perspective view of the game apparatus shown in FIG. 1, as viewed from a rear side.
Figure 3:
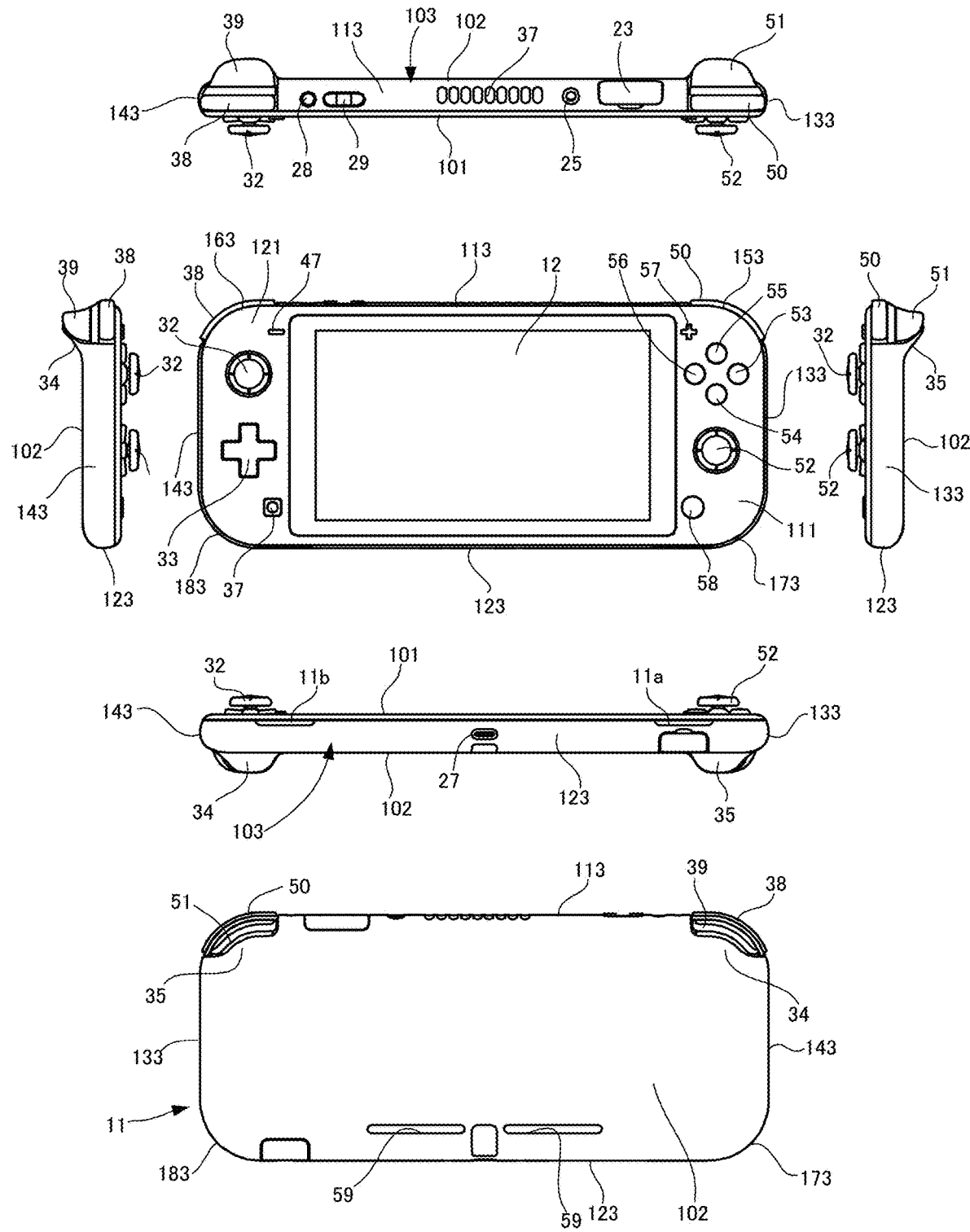
FIG. 3 is a diagram of six surfaces of the game apparatus shown in FIG. 1.

As shown in FIGS. 1 to 3, the game apparatus 1 includes an approximately plate-shaped housing 11 that is laterally elongated. The housing 11 may be of any shape and size, and in one example, the housing 11 may be of a portable size. In the present embodiment, the housing 11 includes: a first main surface 101 that is formed into a rectangular shape; a second main surface that is formed into a rectangular shape on a side opposite to that of the first main surface 101; and a peripheral edge surface 103 that joins the peripheral edge portions of the first main surface 101 and the second main surface 102. Also, the portion at which the first main surface 101 and the peripheral edge surface 103 are joined and the portion at which the second main surface 102 and the peripheral edge surface 103 are joined are chamfered, and are formed by smooth curved surfaces.

The first main surface 101 is the front-side surface of the game apparatus 1, and as will be described later, the first main surface is provided with a display 12. The right end portion and the left end portion of the housing 11 have shapes that can be gripped by the right hand and the left hand respectively. That is, in order to make it easier to grip with the hand, the four corners of the first main surface 101 and the second main surface 102 are formed into circular arc shapes, and the peripheral edge surface 103 is also formed into a circular arc shape so as to conform to the circular arcs of the four corners.

Hereinafter, following the orientation of FIG. 1, the peripheral edge surface 103 is formed by an upper edge surface 113, a lower edge surface 123, a right-side edge surface 133, a left-side edge surface 143, an upper-right corner surface 153, an upper-left corner surface 163, a lower-right corner surface 173, and a lower-left corner surface 183. Also, when the portions of the housing 11 and the portions of the later-described cover 2 are indicated according to name, the portions corresponding to the upper edge surface 113, the lower edge surface 123, the right-side edge surface 133, the left-side edge surface 143, the upper-right corner surface 153, the upper-left corner surface 163, the lower-right corner surface 173, and the lower-left corner surface 183 are respectively referred to as the upper edge portion, the right-side edge, the left-side edge, the lower edge, the upper-right corner portion, the upper-left corner portion, the lower-right corner portion, and the lower-left corner portion in some cases.

In the center of the first main surface 101, the rectangular display 12 is provided, a right-side operation region 111 is provided to the right of the display 12, and a left-side operation region 121 is provided to the left of the display 12. The display 12 displays an image generated by the game apparatus 1. In the present embodiment, a liquid crystal display apparatus (LCD) is used as the display 12. However, any type of display apparatus may be used as the display 12.

Also, the game apparatus 1 includes a touch panel on the screen of the display 12. In the present embodiment, the touch panel uses a method capable of multi-touch input (e.g., a capacitive sensing method). However, the touch panel may be of any type, and for example, a method capable of single-touch input (e.g., a resistive film method) may also be used therein.

Next, the left-side operation region 121 will be described. A joystick 32 (also referred to as an analog stick) is provided on the upper portion of the left-side operation region 121. The joystick 32 can be used as a direction input portion through which a direction can be input. The user can input a direction corresponding to a tilt direction by tilting the joystick 32 (and the user can input a magnitude corresponding to the tilt angle). Note that it is also possible to include a slide stick through which slide input is possible, or the like as the direction input portion, instead of a joystick. Also, in the present embodiment, it is also possible to perform input by pressing down on the joystick 32.

Also, the left-side operation region 121 includes various types of operation buttons. That is, the left-side operation region 121 includes a cross key 33 that can be used also as a direction input portion, below the joystick 32. Furthermore, a minus button 47 is provided above the joystick 32, and an image recording button 37 is provided below the cross key 33.

Also, the upper-left corner surface 163 of the peripheral edge surface 103 is provided with an L button 38 that extends in a circular arc shape along the corner surface, and furthermore, a ZL button 39 is provided on the second main surface 102 side of the L button 38. The ZL button 39 protrudes rearward from the second main surface 102 and can be pressed in from above. Also, a protruding portion 34 is formed below the ZL button 39. The protruding portion 34 is a portion that protrudes from the second main surface 102, and has an inclined surface that heads toward the second main surface 102 going downward from the ZL button 39.

Next, the right-side operation region 111 will be described. The joystick 52 is included as a direction input portion in the center in the up-down direction of the right-side operation region 111. Note that the joystick 52 is located at least downward with respect to the joystick 32 in the up-down direction. In the present embodiment, the joystick 52 has the same configuration as the joystick 32 of the left-side operation region 121. Also, a cross key, a slide stick that can accept slide input, or the like may be included instead of the joystick 52. Also, four operation buttons 53 to 56 (specifically, an A button 53, a B button 54, an X button 55, and a Y button 56) are included above the joystick 52. Furthermore, a plus button 57 is included above the four operation buttons 53 to 56 and a home button 58 is included below the joystick 52.

Also, the upper-right corner surface 153 of the peripheral edge surface 103 is provided with an R button that extends in a circular arc shape along the corner surface, and furthermore, a ZR button 51 is provided on the second main surface side of the R button 50. The ZR button 51 protrudes rearward from the second main surface and can be pushed in from above. Also, a protruding portion 35 is formed below the ZR button 51. The protruding portion 35 is a portion that protrudes from the second main surface 102, and has an inclined surface that heads toward the second main surface 102 going downward from the ZR button 51.

The above-described operation buttons and the like are used to perform instructions corresponding to various types of programs (e.g., an OS program and an application program) executed by the game apparatus 1.

Next, the upper edge surface 113 of the housing 11 will be described. A power button 28, volume buttons 29, exhaust ports 37, an audio input/output terminal 25, and a slot 23, which are aligned from left to right, are provided on the upper edge surface 113. The volume button 29 is for adjusting the volume of sound output from later-described speaker holes 11a and 11b, and the exhaust port 37 is a hole from which air that has cooled a later-described processor inside of the housing 11 is emitted. Also, the audio input/output terminal 25 is a terminal to which an external speaker is connected, and to which a terminal of earphones is connected.

The slot 23 has a shape in which it is possible to mount a predetermined type of storage medium. The predetermined type of storage medium is, for example, a dedicated storage medium (e.g., a dedicated memory card) for the game apparatus 1 and an information processing apparatus of the same type thereas. For example, the predetermined type of storage medium is used to store data to be used by the game apparatus (e.g., save data and the like of an application), and/or a program to be executed by the game apparatus 1 (e.g., a program and the like of an application).

Next, the lower edge surface 123 of the housing 11 will be described. A lower-side terminal 27 is included near the center in the left-right direction of the lower edge surface 123. The lower-side terminal 27 is a terminal through which the housing 11 performs communication with a cradle, which is not shown in the drawing. In the present embodiment, the lower-side terminal 27 is a USB connector (more specifically, a female-side connector). When the housing 11 is placed in the cradle, an image generated and output by the game apparatus 1 can be displayed on a stationary monitor. Also, as will be described later, a battery, which is not shown in the drawings and is included in the housing 11, is connected to the lower-side terminal 27, and when electrical power is supplied to the game apparatus 1 via the lower-side terminal 27, the battery is charged with the supplied electrical power.

The speaker holes 11a and 11b are formed at positions near the first main surface 101 on both sides in the left-right direction of the lower edge surface 123. Speakers, which are not shown in the drawing, are included inside of the housing 11, and the sound output from the speakers is output through the speaker holes 11a and 11b.

Also, although not shown in the drawings, various electronic components such as a battery, a processor (e.g., an SoC including a CPU and a GPU, or the like), a flash memory, and a DRAM, and the like, which are for driving the game apparatus, are arranged inside of the housing 11, and several of these elements may also be installed on an electronic circuit board and stored in the housing 11. Also, the electronic components inside of the housing 11 are electrically connected to and are configured to control the display 12, the touch panel, the various buttons, the terminals, and the like, which are exposed to the outside of the housing 11 as described above. Also, various sensors such as an angular velocity sensor and an acceleration sensor, a camera, and the like can also be included in the housing 11 according to need.

Furthermore, a pair of air suction ports 59 are formed on the lower edge surface 123 side of the second main surface 102. The air suction ports 59 are formed in groove shapes that extend in the left-right direction. Air for cooling the processor is sucked in through these air suction ports 59.

2. Cover

Figure 4:
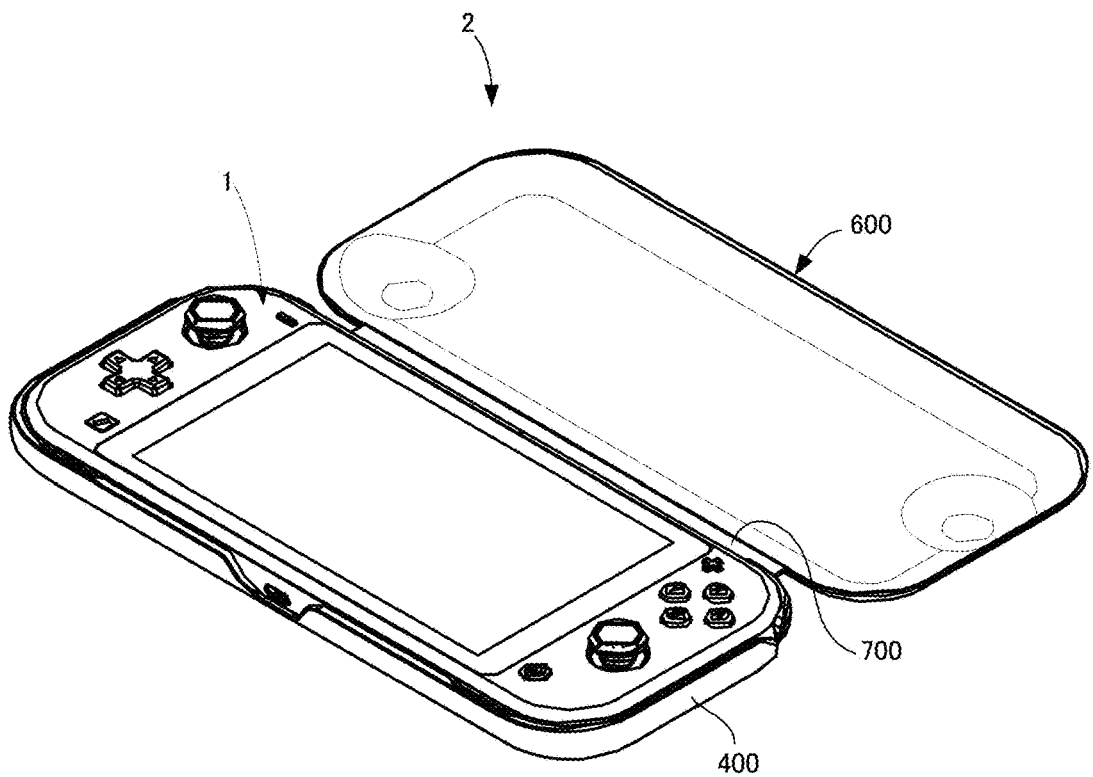
FIG. 4 is a perspective view in which a cover in which the game apparatus is housed is in an open state.
Figure 5:
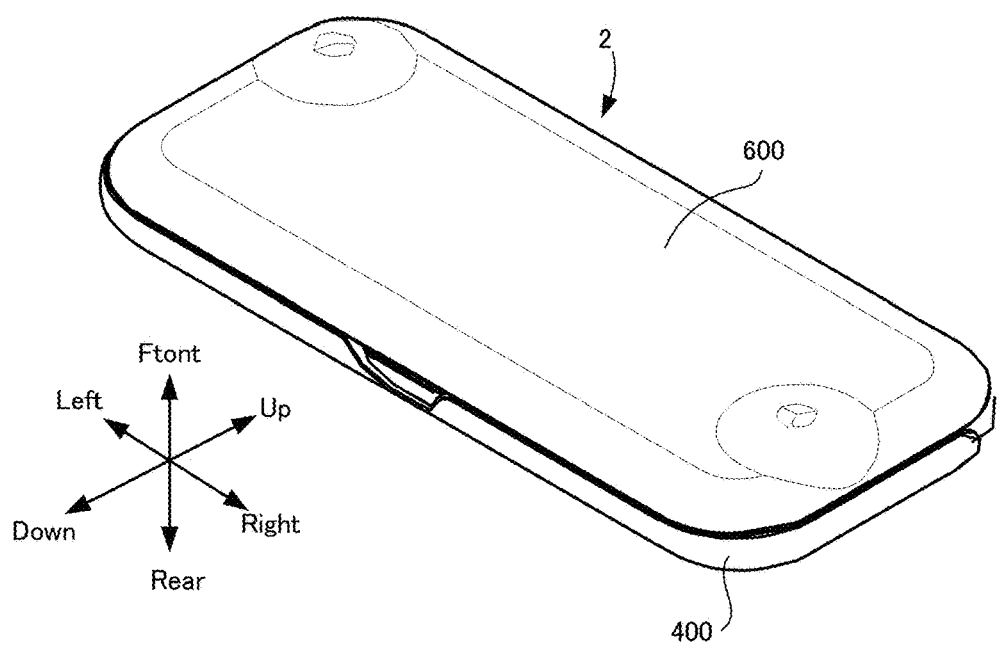
FIG. 5 is a perspective view in which the cover in which the game apparatus is housed is in a closed state.

Next, a cover 2 according to the present embodiment will be described with reference to the drawings. FIG. 4 is a perspective view showing an open state of the cover housing the above-described game apparatus, and FIG. 5 is a perspective view showing a closed state of the cover. Hereinafter, first, the parts included in the cover 2 and their assembly will be described, and thereafter, the overall configuration and method of use of the assembled cover will be described.

2-1. Parts Included in the Cover

The cover 2 according to the present embodiment is constituted by a rear cover member 4, a front cover member 6, a front cover sheet 71 that covers mainly the rear cover member 4, a rear cover sheet 72 that covers mainly the front cover member 6, and an inner cover sheet 73 that covers the inner surfaces of both of the cover members 4 and 6. Hereinafter, the parts will be described in detail. Note that in the following description, the surface of the cover 2 that faces the internal space in which the game apparatus 1 is housed when the cover is in the closed state will be referred to as the inner surface, and the surface of the cover 2 that faces the outer portion will be referred to as the outer surface. Also, the cover 2 and the parts will be described on the basis of the orientation in FIG. 5, for the sake of convenience in the description. That is, although description will be given on the basis of the orientation when the cover is in the closed state, the present disclosure is not limited to this orientation.

2-1-1. Rear Cover Member

Figure 6:
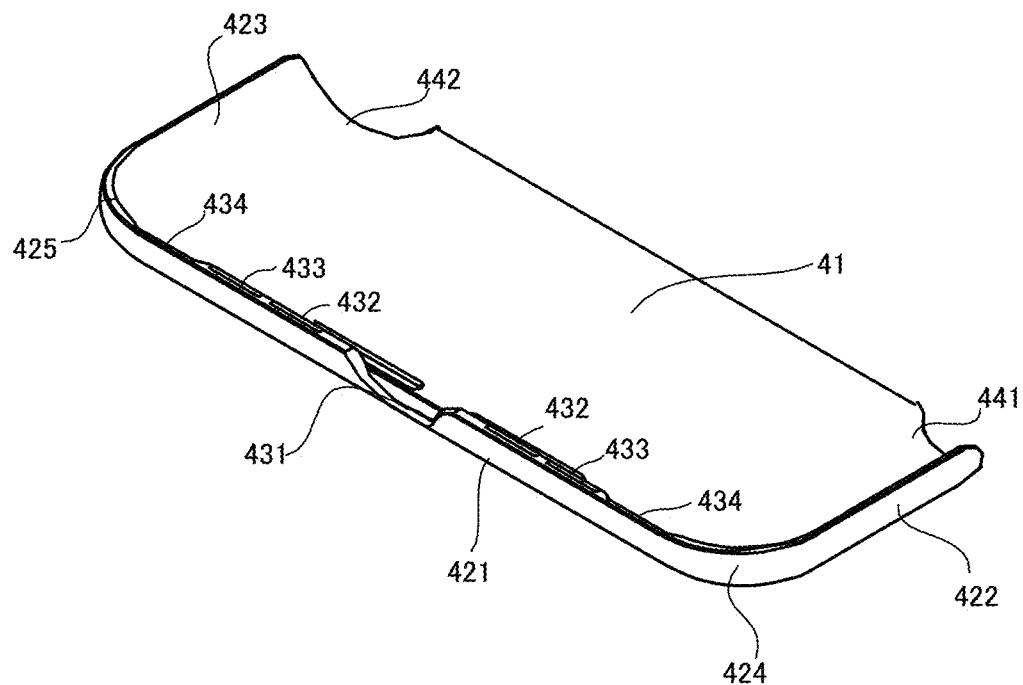
FIG. 6 is a perspective view of a rear cover as viewed from the front side.
Figure 7:
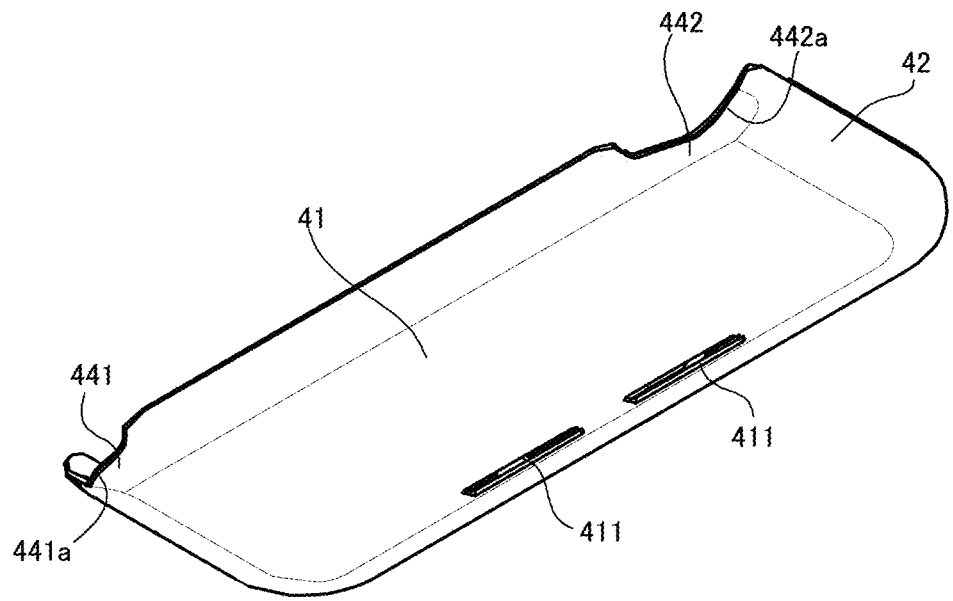
FIG. 7 is a perspective view of a rear cover member as viewed from the rear side.
Figure 8:
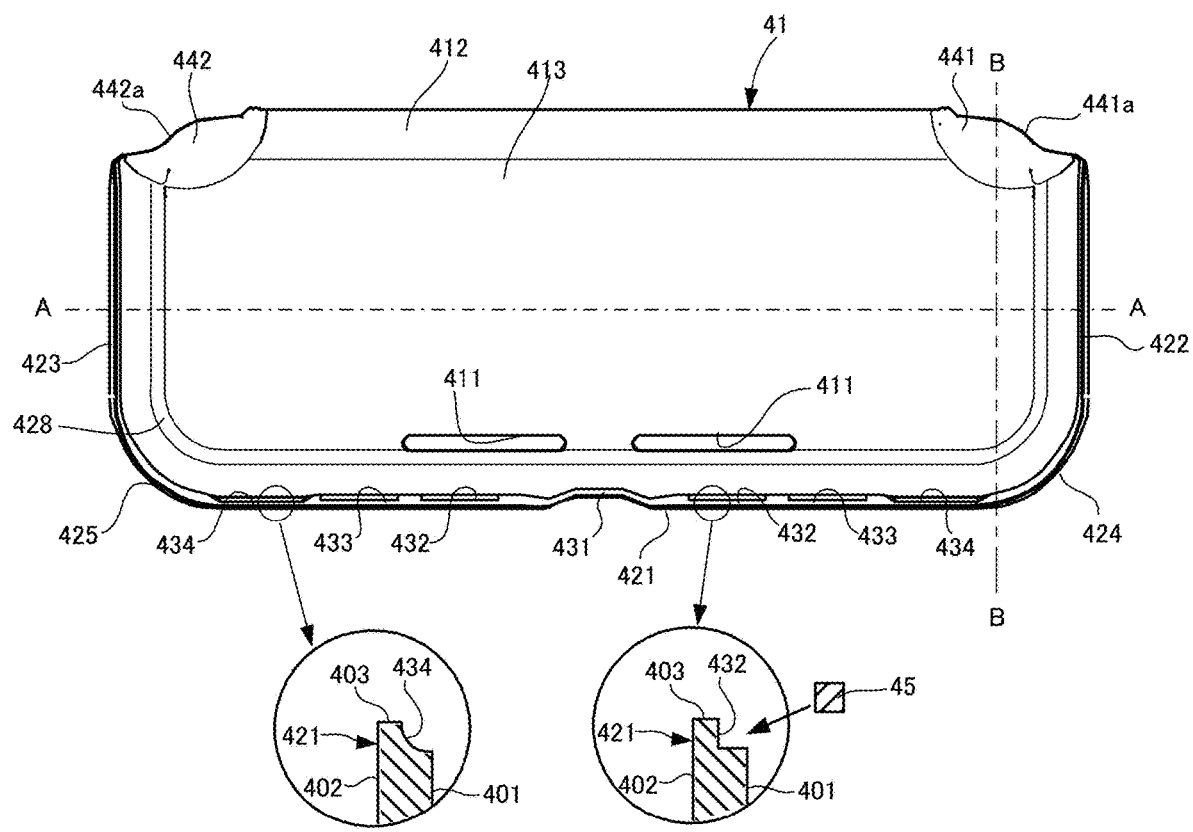
FIG. 8 is a plan view of an inner surface of the rear cover member.
Figure 9:
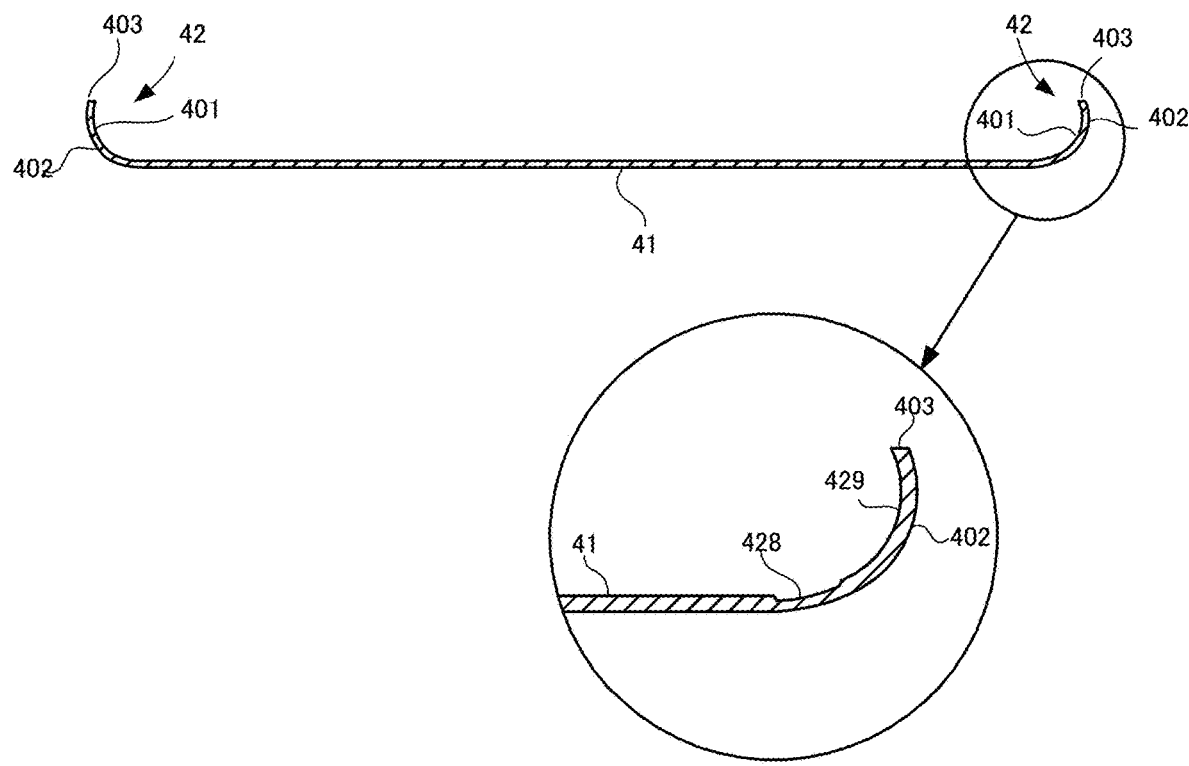
FIG. 9 is a cross-sectional view taken along line A-A in FIG. 8.
Figure 10:
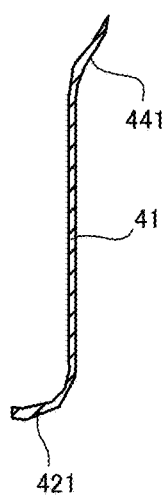
FIG. 10 is a cross-sectional view taken along line B-B in FIG. 8.
Figure 11:
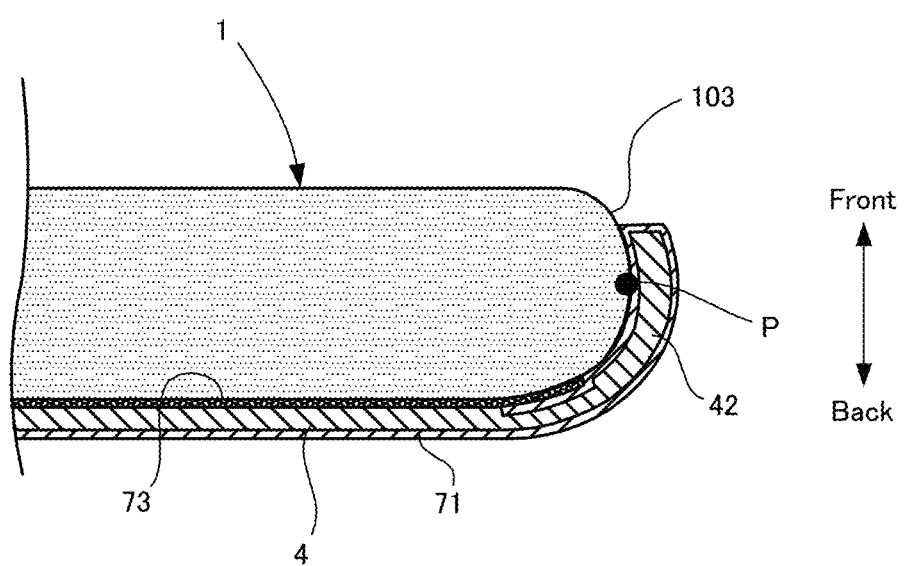
FIG. 11 is a cross-sectional view for illustrating an engaged state in which a peripheral edge surface of the game apparatus and side wall portions of the rear cover member are engaged with each other.

FIG. 6 is a perspective view of the rear cover member as viewed from the front side, FIG. 7 is a perspective view of the rear cover member as viewed from the rear side, FIG. 8 shows a plan view and partially enlarged views of an inner surface of the rear cover member, FIG. 9 shows a cross-sectional view taken along line A-A in FIG. 8 and a partially enlarged view, FIG. 10 is a cross-sectional view taken along line B-B in FIG. 8, and FIG. 11 is a cross-sectional view for illustrating a state in which the side wall portions and the game apparatus are engaged with each other. As shown in FIGS. 6 to 11, the rear cover member 4 is a member that is constituted by a resin material, a metal, or the like, and that covers mainly the second main surface 102 of the game apparatus 1. Specifically, the rear cover member 4 includes: a plate-shaped base portion 41 that is formed into a rectangular shape; and a side wall portion 42 that is U-shaped in plan view and extends from the peripheral edge of the base portion 41. Also, the rear cover member 4 is configured such that when the game apparatus 1 is housed in the cover 2, the base portion 41 comes into contact with the second main surface 102 of the game apparatus 1 and the side wall portion 42 comes into contact with the peripheral edge surface 103. Hereinafter, the side wall portion 42 and the base portion 41 will be described in detail.

First, the side wall surfaces 42 will be described. As shown in FIG. 9, the side wall portion 42 is formed into a circular arc shape in cross-section so as to protrude to the outside, and the side wall portion 42 is constituted by an inner surface 401, an outer surface 402, and an edge surface 403 that connects the leading ends of the inner surface 401 and the outer surface 402. Also, as shown in FIG. 8, the side wall portion 42 includes a lower edge portion 421, a right-side edge portion 422, a left-side edge portion 423, a lower-right corner portion 424, and a lower-left corner portion 425, which correspond to the lower edge surface 123, the right-side edge surface 133, the left-side edge surface 143, the lower-right corner surface 173, and the lower-left corner surface 183 of the game apparatus 1. That is, the side wall portion 42 is not provided with portions corresponding to the upper edge surface 113, the upper-right corner surface 153, and the upper-left corner surface 163 of the game apparatus 1, and is open at these portions. Accordingly, as will be described later, when the game apparatus 1 is housed in the rear cover 400, the game apparatus 1 can be housed therein from the open portion.

A trapezoidal first rear notch portion 431 is formed near the center in the left-right direction of the lower edge portion 421. The first rear notch portion 431 approximately reaches the base portion 41, and the lower-side terminal 27 of the housed game apparatus 1 is exposed to the outside from the first rear notch portion 431. Also, on the lower edge portion 421, two notch portions, that is, second and third rear notch portions 432 and 433, are formed on each of the two sides of the first rear notch portion 431. The second rear notch portions 432 are adjacent to the first rear notch portion 431, and the third rear notch portions 433 are formed toward the side edge portions 422 and 423 with respect to the second rear notch portions 432. To give a more detailed explanation, the second and third rear notch portions 432 and 433 are formed so as to extend along the lower edge portion 421.

Also, as shown in the enlarged views of FIG. 8, the second and third rear notch portions 432 and 433 are formed into rectangular shapes in cross-section that are open at the end surface 403 and the inner surface 401 of the lower end portion 421, and cuboid magnets 45 are arranged in these rear notch portions 432 and 433.

The magnets 45 have shapes that fit inside of the rear notch portions 432 and 433, and are fixed to the rear notch portions 432 and 433 using adhesive. Accordingly, the magnets 45 are arranged so as to be exposed at the end surface 403 and the inner surface 401 of the lower end portion 421.

Also, fourth rear notch portions 434 are formed toward the side edge portions 422 and 423 with respect to the third rear notch portions 433. The fourth rear notch portions 434 are arranged at positions corresponding to the speaker holes 11a and 11b of the game apparatus 1. To give a more detailed description, the fourth rear notch portions 434 are formed so as to extend along the end surface 403 of the lower edge portion 421. Also, the fourth rear notch portions 434 are formed into circular arc shapes in cross-section, which are open at the end surface 403 and the inner surface 401 of the lower edge portion 421. Due to these fourth rear notch portions 434, the speaker holes 11a and 11b of the housed game apparatus 1 are exposed to the outside in the open state, without being closed by the lower edge portion 421. Also, the sound from the speaker holes 11a and 11b is emitted to the outside through the fourth rear notch portions 434.

As shown in FIG. 11, the height of the side wall portion 42 is approximately two-thirds of the height of the peripheral edge surface 103 of the game apparatus 1. That is, when the game apparatus 1 is housed, the side wall portion 42 extends slightly frontward with respect to the outermost portion of the peripheral edge surface 103 of the game apparatus 1, that is, a peak portion P of the circular arc. Accordingly, in the side wall portion 42, the portion on the front side with respect to the outermost portion P of the peripheral edge surface 103 of the game apparatus 1 is retained, and as will be described later, the game apparatus 1 is prevented from separating from the rear cover in the cover 2.

Next, the thickness of the side wall portion 42 will be described. The right-side edge portion 422 and the left-side edge portion 423 of the side wall portion 42 are thinner than the lower edge portion 421, the lower-right corner portion 424, and the lower-left corner portion 425. This is because the right-side edge portion 422 and the left-side edge portion 423 are at positions corresponding to the right end portion and the left end portion of the game apparatus 1, which are gripped by the user. That is, as will be described later, when a game is played while the game apparatus 1 is housed in the cover 2, the user grips the right end portion and the left end portion of the game apparatus 1 via the right-side edge portion 422 and the left-side edge portion 423. At this time, if the right-side edge portion 422 and the left-side edge portion 423 are too thick, the user will feel discomfort, and therefore the right-side edge portion 422 and the left-side edge portion 423 are thin, and may have thicknesses of about 1.0 mm to 2.5 mm, and furthermore, about 1.6 to 1.8 mm.

On the other hand, the lower edge portion 421 is provided with the rear notch portions 431 to 434 as described above. Therefore, the lower edge portion 421 is made thicker than the right-side edge portion 422 and the left-side edge portion 423 such that strength can be maintained even if the rear notch portions 431 to 434 are formed. For example, the lower edge portion 421 may have a thickness of about 1.5 to 3.3 mm, and furthermore, can have a thickness of 2.0 to 2.5 mm. Also, the lower-right corner portion 424 and the lower-left corner portion 425 are formed so as to gradually become thinner as they approach the right-side edge portion 422 and the left-side edge portion 423 from the lower edge portion 421. Note that as will be described later, the rear cover member 4 may be covered by the rear cover sheet 71, and at this time, the thicknesses of the two side edge portions 422 and 423 and the lower edge portion 421, which include the thickness of the rear cover sheet 71 as well, may be within the above-described ranges.

Figure 27:
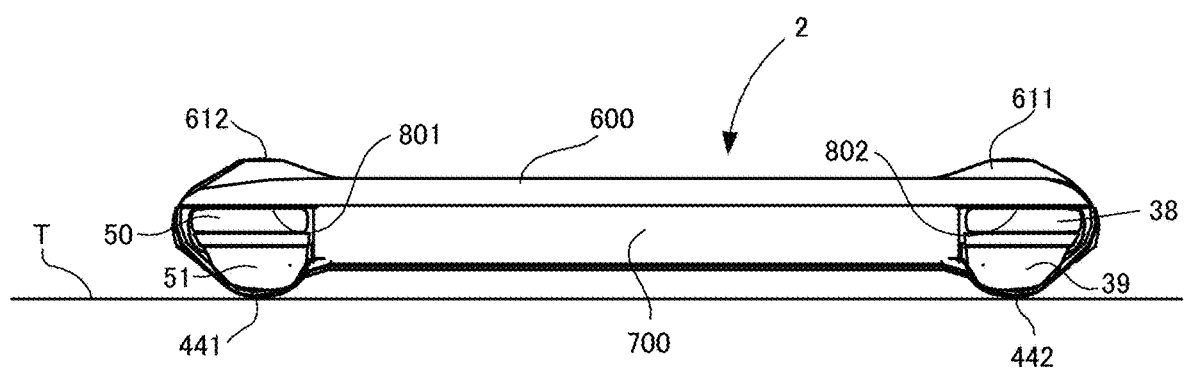
FIG. 27 is a top view for illustrating a method for using the cover.

Next, the base portion 41 will be described. As described above, the base portion 41 is configured so as to come into contact with the second main surface 102 of the game apparatus 1. Also, in the base portion 41, as shown in FIG. 10, extended portions 441 and 442 that extend rearward are joined at the positions corresponding to the upper-right corner surface 153 and the upper-left corner surface 163 of the game apparatus 1. The extended portions 441 and 442 are formed by curved surfaces that cover the protruding portions 34 and 35 formed on the second main surface 102 of the game apparatus 1, and furthermore extend slightly rearward with respect to the rear edges of the ZR button 51 and the ZL button 39. Accordingly, as shown in FIG. 27, which will be described later, when the rear cover is placed on an installation surface with the game apparatus 1 housed, the rear edges of the extended portions 441 and 442 come into contact with the installation surface, thereby suppressing a case in which the ZL button 39 and the ZR button 51 come into contact with the installation surface.

Also, when the user grips the two end portions of the game apparatus 1 housed in the cover 2, the user can hook his or her fingers into the extended portions 441 and 442, which is advantageous in that gripping is easier. Furthermore, as shown in FIGS. 7 and 8, the edge portions 441a and 441b of the extended portions 441 and 442 are constituted by smooth curved lines. This makes it possible to suppress discomfort felt when a finger of the user touches the edge portion of the extended portion when playing a game.

Also, in the base portion 41, through holes 411 are formed at positions corresponding to the pair of air suction ports 59 formed in the second main surface 102 when the game apparatus 1 is housed. The through holes 411 are formed into shapes that match the air suction ports 59, that is, groove shapes that are narrow and extend in the left-right direction, and the through holes 411 penetrate through the base portion 41 and are open to the outside.

Furthermore, as shown in the enlarged views in FIGS. 8 and 9, a first thin portion 428 that extends along the boundary with the base portion 41 is formed on the inner surface of the side wall portion 42. Accordingly, level differences are formed at the boundary between the first thin portion 428 and the base portion 41, and at the boundary between the first thin portion 428 and the region toward the end surface 403 with respect thereto (hereinafter referred to as "end portion region 429"). As will be described later, the front cover sheet 71 is arranged on the first thin portion 428, and at this time, the depth of the first thin portion 428 is adjusted such that the front cover sheet 71 and the base portion 41 are level with each other.

Also, as shown in FIG. 8, a second thin portion 412 is formed in a region conforming to the upper edge portion on the inner surface of the base portion 41. Accordingly, a level difference is formed at the boundary between the second thin portion 412 and the region on the lower edge portion side with respect thereto (hereinafter referred to as "inner region 413"). As will be described, the front cover sheet 71 and the rear cover sheet 72 are stacked in the stated order on the second thin portion 412, and at this time, the depth of the second thin portion 412 is adjusted such that the front cover sheet 72 and the inner region 413 of the base portion 41 are level with each other.

2-1-2. Rear Cover Sheet

Next, the rear cover sheet 71 will be described. The rear cover sheet 71 is made of a sheet made of resin, woven fabric, or the like, and is adhered to the entireties of the outer surface 402 and the end surface 403 of the rear cover member 4 and a portion of the inner surface 401. In particular, if the rear cover sheet 71 is made of woven fabric, there is an advantage in that when the cover 2 is gripped by a hand, slipping is not likely to occur, and furthermore, fingerprints are not likely to be left.

Figure 12:
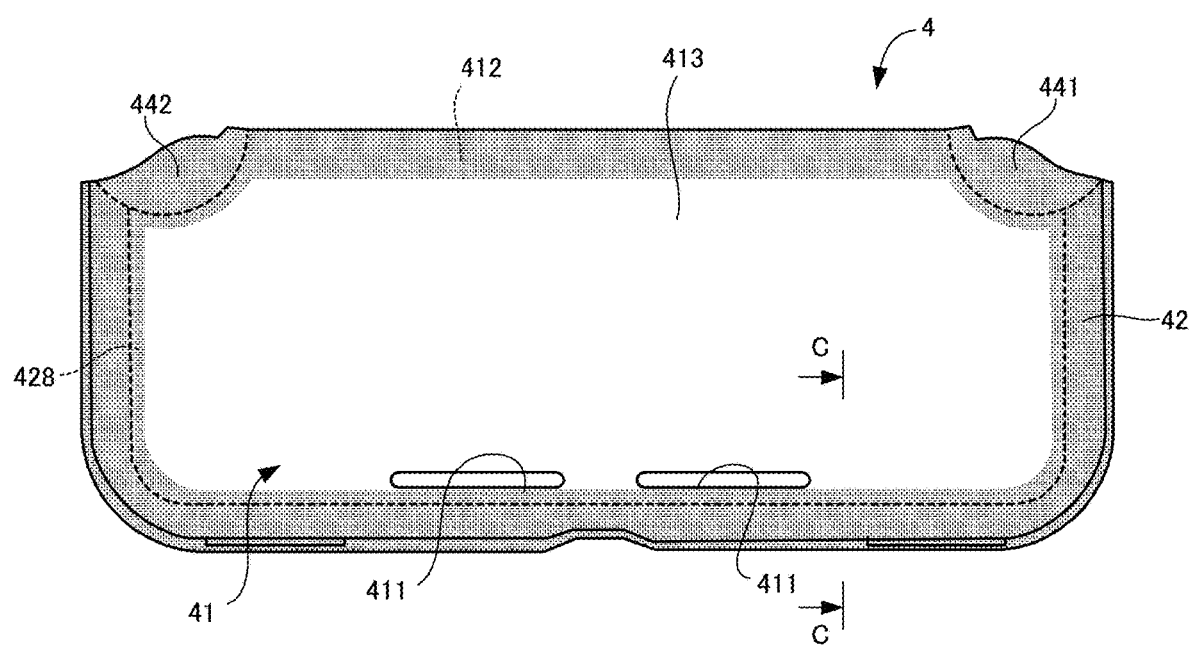
FIG. 12 is a plan view of an inner surface of the rear cover member to which a rear cover sheet is adhered.
Figure 13:
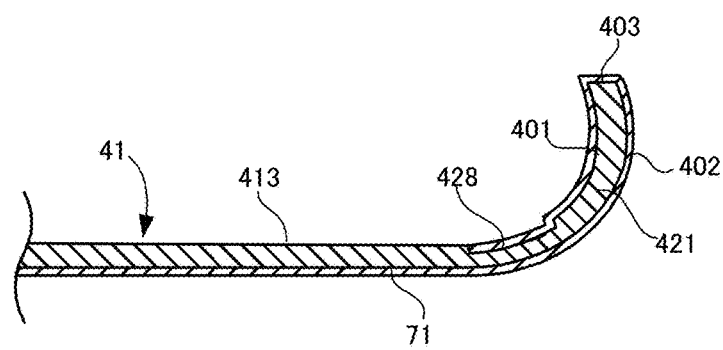
FIG. 13 is a cross-sectional view taken along line C-C in FIG. 12.

FIG. 12 is a plan view of the inner surface of the rear cover member covered by the rear cover sheet, and FIG. 13 is a cross-sectional view taken along line C-C in FIG. 12. In FIG. 12, the rear cover sheet 71 is shown in gray. As shown in FIGS. 12 and 13, the rear cover sheet 71 covers the outer surface 402 of the rear cover member 4, is further folded over at the end surface 403 of the side wall portion 42, and extends toward the inner surface 401. Also, the rear cover sheet 71 extends so as to cover the side wall portion 42 including the first thin portion 428. Also, the rear cover sheet 71 is folded over at the upper edge portion of the base portion 41 as well, and extends so as to cover the inner surfaces of the extended portions 441 and 442 and the second thin portion 412. Accordingly, the rear cover sheet 71 is configured to cover approximately all of the base portion 41 except for the inner region 413 in the rear cover member 4. Note that the rear cover sheet 71 can be adhered to the rear cover member 4 using an adhesive such as a hot melt, double-sided tape, or the like.

2-1-3. Front Cover Member

Figure 14:
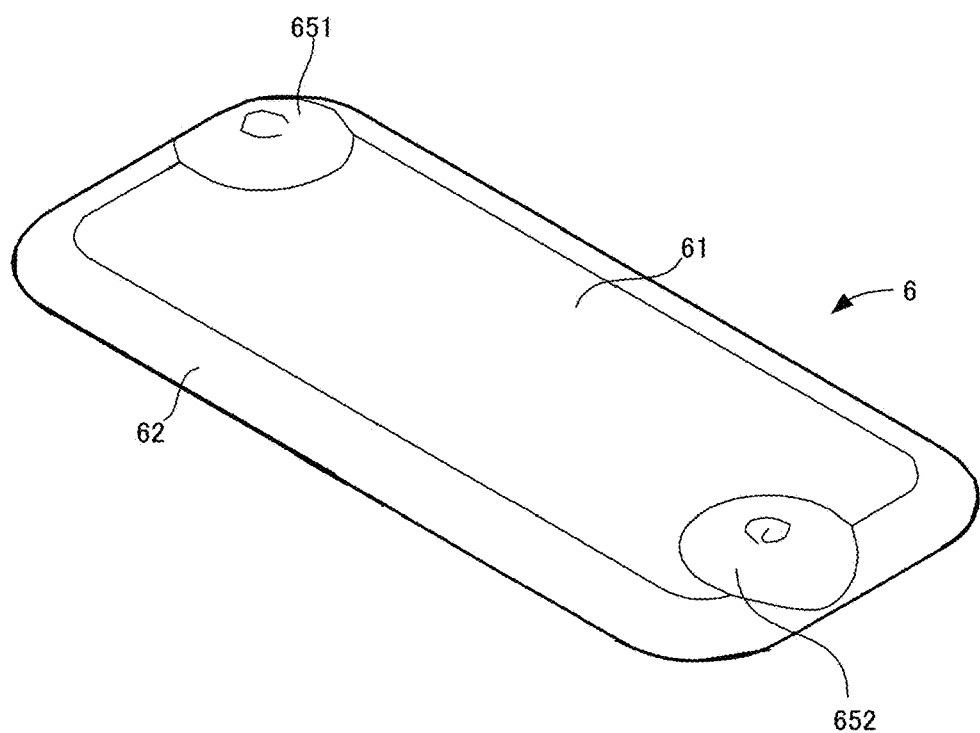
FIG. 14 is a perspective view of a front cover as viewed from the front side.
Figure 15:
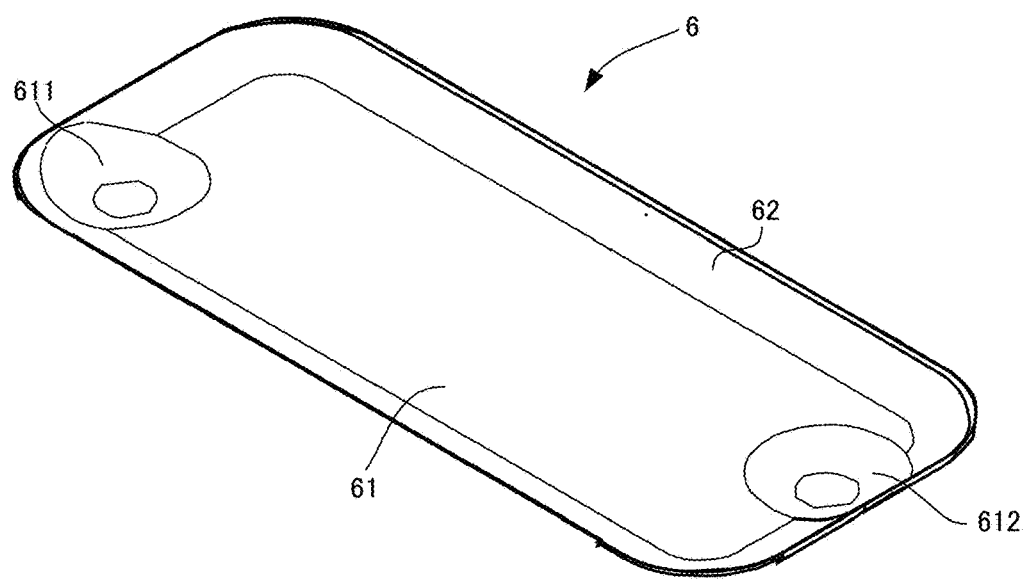
FIG. 15 is a perspective view of a front cover member in an open state.
Figure 16:
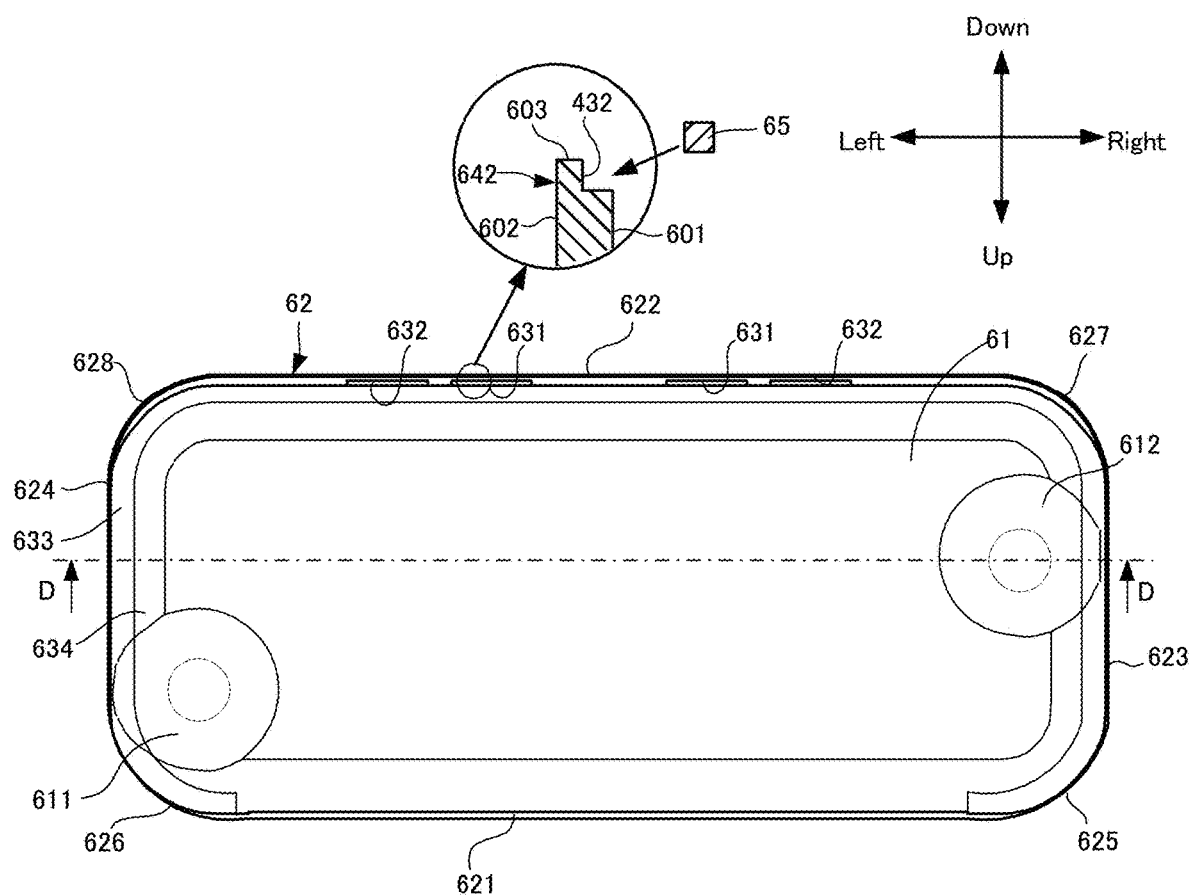
FIG. 16 is a plan view of an inner surface of the front cover.
Figure 17:
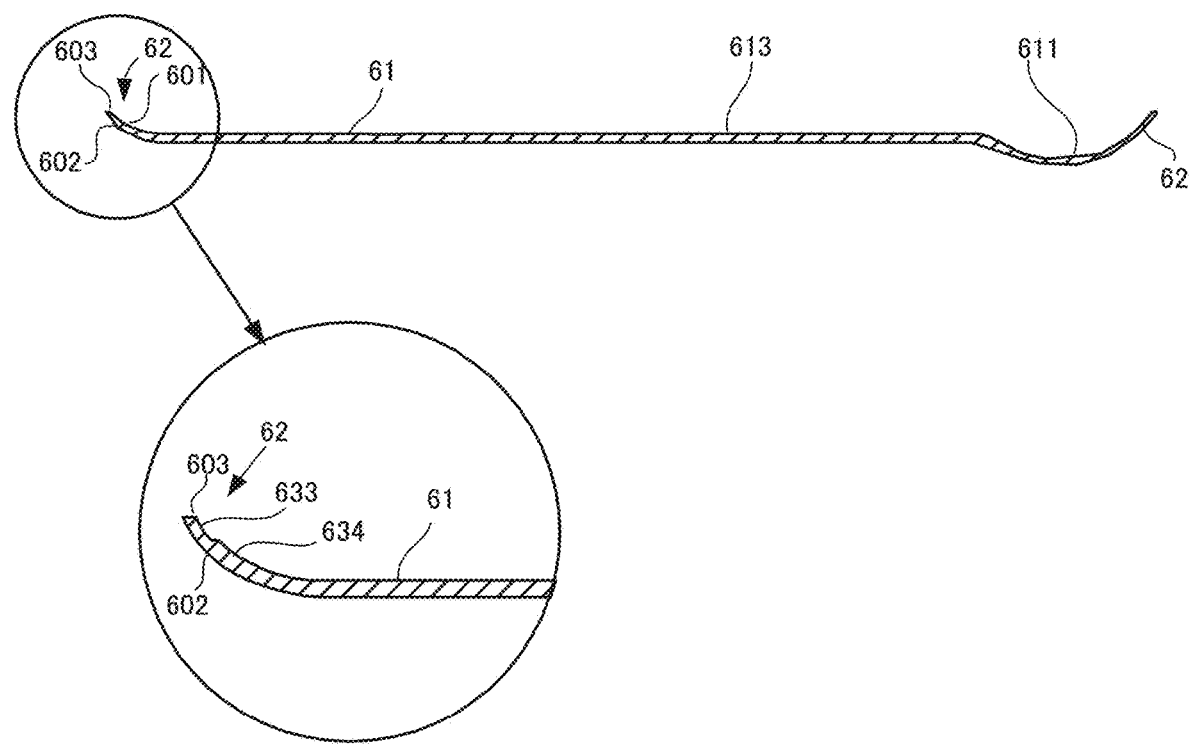
FIG. 17 is a cross-sectional view taken along line D-D in FIG. 16.
Figure 18:
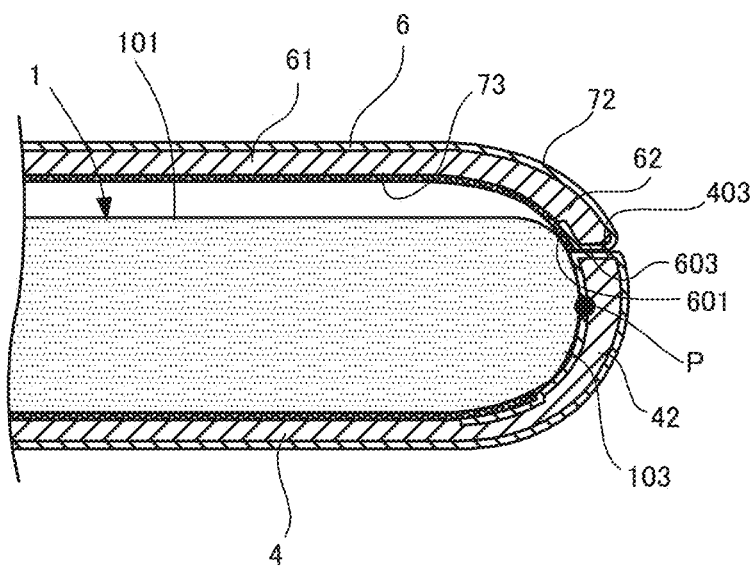
FIG. 18 is a cross-sectional view of the cover in a closed state.
Figure 19:
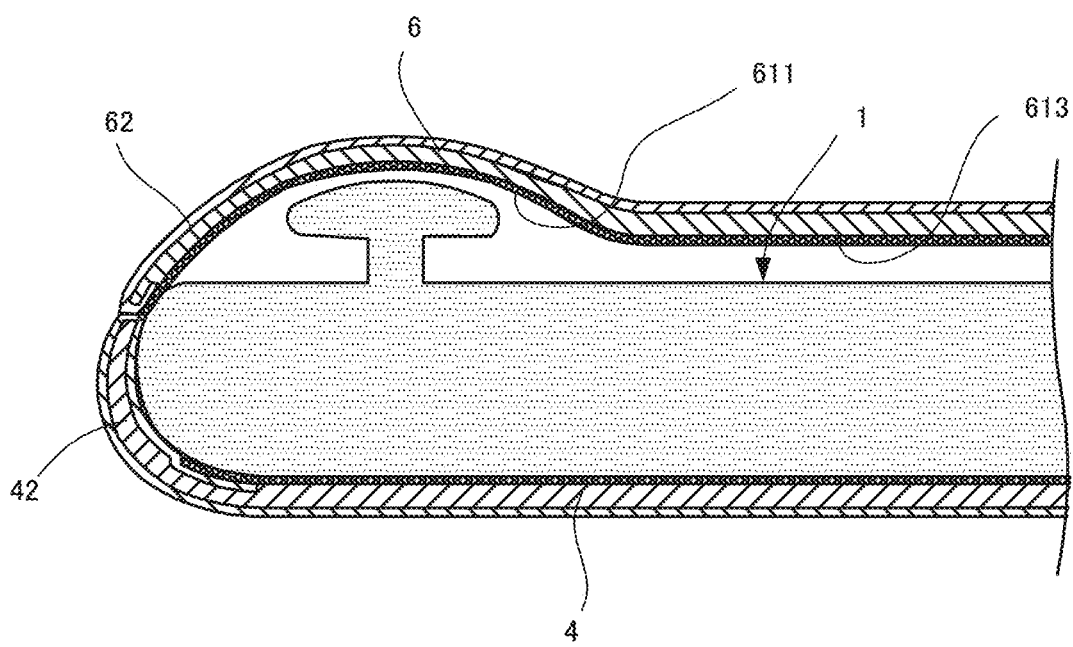
FIG. 19 is a cross-sectional view of the cover in the closed state.

Next, the front cover member will be described with reference to FIGS. 14 to 19. FIG. 14 is a perspective view of the front cover member as viewed from the front side, FIG. 15 is a perspective view of the front cover member in the open state, FIG. 16 is a plan view of the inner surface of the front cover member in the open state, FIG. 17 shows a cross-sectional view taken along line D-D in FIG. 16 and a partial enlarged view, and FIGS. 18 and 19 are cross-sectional views of the cover in the closed state. Note that since FIGS. 15 and 16 are diagrams viewed from the front side when it is assumed that the cover is in the open state, the orientation of the drawings is such that the up and down directions are reversed with respect to the reference of FIG. 5.

As shown in FIGS. 14 to 19, the front cover member 6 is a member that is constituted by a resin material, a metal, or the like, and covers mainly the first main surface 101 of the game apparatus 1. Specifically, the front cover member 6 includes: a plate-shaped base portion 61 that is formed into a rectangular shape; and a side wall portion 62 that is frame-shaped in plan view and extends from the peripheral edge of the base portion 61. Hereinafter, the side wall portion 62 and the base portion 61 will be described in detail.

First, the side wall portion 62 will be described. As shown in FIG. 17, the side wall portion 62 is formed into a circular arc shape in cross section so as to protrude to the outside, and is constituted by an inner surface 601, an outer surface 602, and an end surface 603 that joins the leading ends of the inner surface 601 and the outer surface 602. Also, as shown in FIG. 16, the side wall portion 62 includes an upper edge portion 621, a lower edge portion 622, a right-side edge portion 623, a left-side edge portion 624, an upper-right corner portion 625, an upper-left corner portion 626, a lower-right corner portion 627, and a lower-left corner portion 628, which correspond to the lower edge surface 123, the upper edge surface 113, the right-side edge surface 133, the left-side edge surface 143, the lower-right corner surface 173, and the lower-left corner surface 183 of the game apparatus 1. That is, the side wall portion 62 is formed so as to surround the entire periphery of the peripheral edge surface 103 of the game apparatus 1.

In the present embodiment, first front notch portions 631 and second front notch portions 632, which have the same shape as the second and third rear notch portions 432 and 433, are formed at positions corresponding to the second and third rear notch portions 432 and 433 of the rear cover member 4 in the closed state in the lower edge portion 622. To give a more detailed description, the first and second front notch portions 631 and 632 are formed so as to extend along the lower edge portion 622. Also, as shown in the enlarged view of FIG. 16, the first and second front notch portions 631 and 632 are formed into rectangular shapes in cross section, which are open at the end surface 603 and the inner surface 601 of the lower edge portion 622, and cuboid magnets 65 that are the same shape as the above-described magnets 45 are arranged in the front notch portions 631 and 632. The magnets 65 are fixed to the notch portions 631 and 632 using adhesive. Accordingly, the magnets 65 are arranged so as to be exposed at the end surface 603 and the inner surface 601 of the lower edge portion 622. Also, since the magnets 45 of the rear cover 4 and the magnets 65 of the front cover 6 are arranged at opposing positions in the closed state, the closed state is maintained using the magnetic force of the magnets 45 and 46.

Furthermore, as shown in the enlarged views in FIGS. 16 and 17, a thin portion 633 that has a small thickness and extends from the end surface 603 is formed on the inner surface 601 of the side wall portion 62, except for the upper edge portion 621. Accordingly, in the inner surface 601 of the side wall portion 62 other than the upper edge portion 621, a level difference is formed on the boundary between the thin portion 633 and the region inward with respect thereto (hereinafter referred to as "inner region 634"). Note that the thin portion is not formed on the inner surface of the upper edge portion 621 of the side wall portion. Also, the depth from the inner region 634 is the same over the entirety of the thin portion 633. As will be described later, the front cover sheet 72 is arranged on the thin portion 633, and when the front cover sheet 72 is arranged, its depth is adjusted such that the inner region 634 and the surface of the front cover sheet 72 are level with each other.

The height of the side wall portion 62 is adjusted as follows. That is, as shown in FIG. 18, the side wall portion 62 is adjusted such that when the end surface 603 of the front cover member 6 and the end surface 403 of the rear cover member 4 come into contact with each other via the front cover sheet 72 and the rear cover sheet 71 and the closed state is entered, a gap is formed between the first main surface 101 and the base portion 61 of the game apparatus 1, and the inner surface 601 of the side wall portion 62 slightly comes into contact with the peripheral edge surface 103 of the game apparatus 1 via the front cover sheet 72 and the inner cover sheet 73. Accordingly, in the closed state, the end surface 603 of the side wall portion 62 does not reach the outermost portion of the peripheral edge surface 103 of the game apparatus 1, or in other words, the peak portion P of the circular arc. Accordingly, unlike the side wall portion 42 of the rear cover member 4, the side wall portion 62 of the front cover member 6 does not constitute a retainer.

Note that the height of the upper edge portion 621 also does not reach the outermost portion of the upper edge surface 113 of the game apparatus 1. Furthermore, the height of the upper edge portion 621 may be less than or equal to the height of the other portions of the side wall portion 62. In the present embodiment, the side wall portion 42 is not provided at a position corresponding to the upper edge surface 113 of the game apparatus 1 on the rear cover member 4, and accordingly, the end surface 603 of the upper edge portion 621 does not come into contact with any portion thereof when the cover 2 is in the closed state. However, due to the existence of the upper edge portion 621, it is easier to perform positioning when closing the front cover 600, and it is possible to suppress a case in which the front cover 600 wobbles in the closed state.

Also, in the closed state, the end surface 603 of the side wall portion 62 and the end surface 403 of the side wall portion 42 of the rear cover member 4 come into contact with each other stably, and therefore, as shown in FIG. 18, the thickness of the side wall portion 62 of the front cover member 6 and the thickness of the side wall portion 42 of the rear cover member 4 may be made the same as each other.

Next, the base portion 61 will be described. As shown in FIGS. 14 to 19, recessed portions 611 and 612 are formed on the inner surface of the base portion 61 at positions opposing the above-described joysticks 32 and 52. These recessed portions 611 and 612 suppress a case in which the inner surface 601 of the base portion 61 interferes with the joysticks 32 and 52 when the cover 2 is in the closed state. The recessed portions 611 and 612 are formed into circular shapes in plan view, and are formed such that their depths gently decrease from their centers to their peripheral edges. Also, the recessed portions 611 and 612 are configured such that the centers of the recessed portions 611 and 612 are arranged on extensions of the axial lines of the joysticks 32 and 52 in the closed state of the cover 2. Also, the portions near the peripheral edges of the recessed portions 611 and 612 reach the inner surface 601 of the side wall portion 62. Hereinafter, for the sake of convenience in the description, the region other than those at which the recessed portions 611 and 612 are formed on the inner surface 601 of the base portion 61 will be referred to as "main region 613". As described above, when the cover 2 is in the closed state, a gap is formed between the inner surface 601 of the base portion 61 and the first main surface 101 of the game apparatus 1, and this suppresses a case in which the main region 613 interferes with the various buttons 33, 37, 47, and 53 to 58 other than the joysticks 32 and 52. However, as shown in FIG. 19, since the main region 613 will interfere with the joysticks 32 and 52 in the gap, the recessed portions 611 and 612 are formed at the positions corresponding to the joysticks 32 and 52. Note that the shapes of the recessed portions 611 and 612 need not be circular in plan view. At this time, the recessed portions 611 and 612 may be configured such that the deepest locations of the recessed portions 611 and 612 are arranged on extensions of the joysticks 32 and 52 or on extensions of the axial lines in the closed state of the cover 2.

On the other hand, on the outer surface 602 of the base portion 61, the portions corresponding to the recessed portions 611 and 612 bulge from the portions corresponding to the main region 613. That is, bulging portions 651 and 652 whose heights gently increase from their peripheral edges to their centers are formed on the outer surface 602 of the base portion 61 so as to conform to the shapes of the recessed portions 611 and 612. In other words, the bulging portions 651 and 652 are located on the side opposite to the recessed portions 611 and 612, and the recessed portions 611 and 612 and the bulging portions 651 and 652 are in a front-rear positional relationship on the base portion 61. Note that the shapes of the bulging portions 651 and 652 need not conform to the shapes of the recessed portions 611 and 612. That is, the shapes of the bulging portions 651 and 652 need not be, for example, analogous to the shapes of the recessed portions 611 and 612. Also, the deepest positions of the recessed portions 611 and 612 and the highest positions of the bulging portions 651 and 652 need not match, and may be shifted with respect to each other as long as they are at approximately opposite positions.

2-1-4. Front Cover Sheet

Next, the front cover sheet 72 will be described with reference to FIGS. 20 and 21. The front cover sheet 72 is made of a sheet made of resin, woven cloth, or the like, but if the front cover sheet 72 is made of woven cloth, the front cover sheet 72 will have similar advantages to those described for the rear cover sheet 71. Note that from the viewpoint of uniformity in design, identical raw materials may be used for the front cover sheet 72 and the rear cover sheet 72, and identical or related designs may be used therefor.

Figure 20:
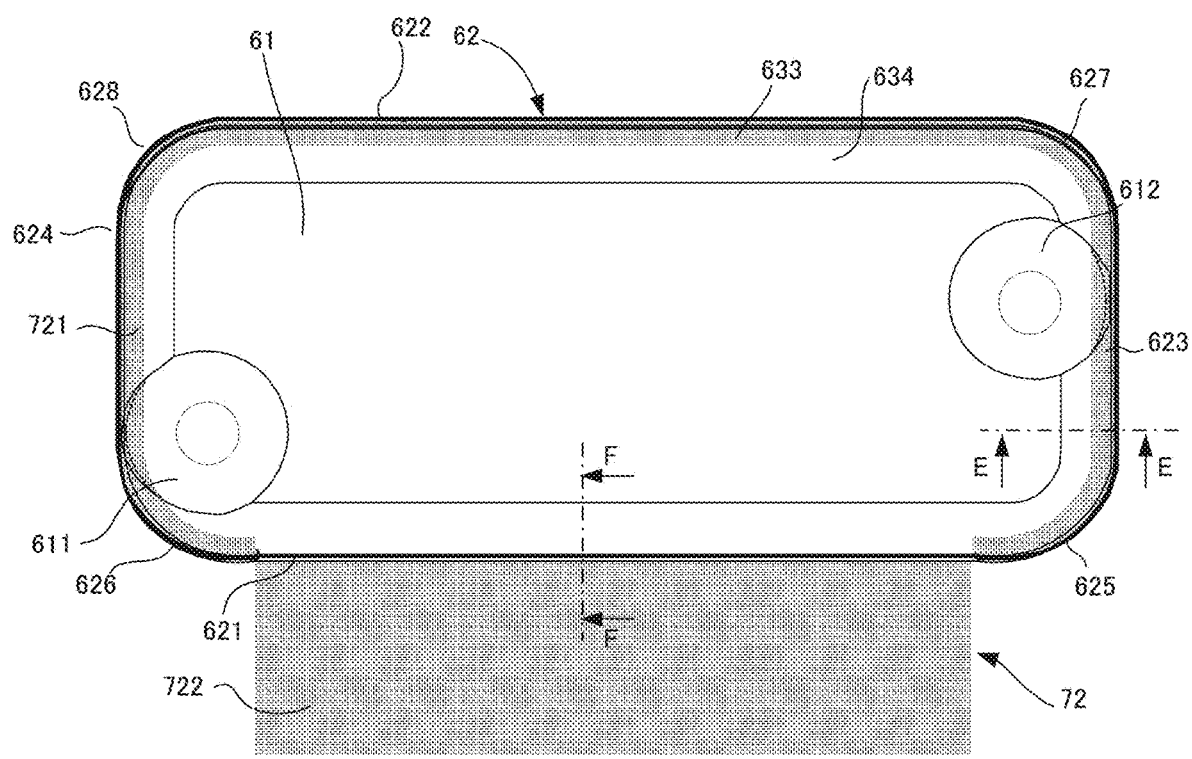
FIG. 20 is a plan view of an inner surface of the front cover member to which a front cover sheet is adhered.
Figure 21:
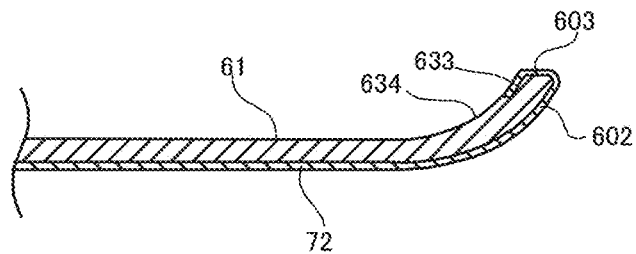
FIG. 21 is a cross-sectional view taken along line E-E in FIG. 20.
Figure 22:
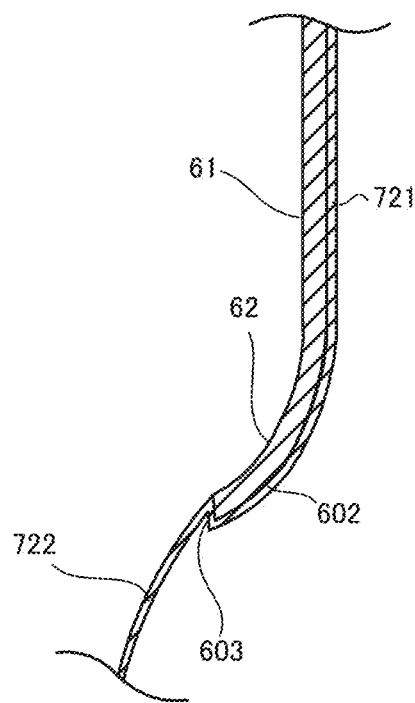
FIG. 22 is a cross-sectional view taken along line F-F in FIG. 20.

FIG. 20 is a plan view of the inner surface of the front cover member covered by the front cover sheet, FIG. 21 is a cross-sectional view taken along line E-E in FIG. 20, and FIG. 22 is a cross-sectional view taken along line F-F in FIG. 20. In these diagrams, the front cover sheet 72 is shown in gray. The front cover sheet 72 includes a first portion 721 that covers the front cover member 6, and a second portion 722 that extends from the first portion 721 toward the rear cover member. The first portion 721 covers the outer surface 602 of the front cover member 6, is folded over at the end surface 603 of the side wall portion 62 other than the upper edge portion 621, and extends so as to cover the thin portion 633 of the inner surface 601.

Also, as shown in FIG. 22, in the first portion 721, the portion corresponding to the upper edge portion 621 of the side wall portion 62 covers the outer surface 602 and the end surface 603 of the upper edge portion 621. Also, at the first portion 721, the second portion 722 is integrally joined to the portion corresponding to the end surface 603 of the upper edge portion 621. The second portion 722 is formed in a band shape. More specifically, the second portion 722 protrudes from the upper edge portion 621 of the side wall portion 62 of the front cover member 6, and is configured such that the end portion of the upper edge portion 621 covers the second thin portion 412 of the base portion 41 of the rear cover member 4. The portion of the second portion 722 other than the portion covering the rear cover member 4 extends between the front cover member 6 and the rear cover member 4, and this portion covers the upper edge surface 113 of the game apparatus 1. Thus, the front cover sheet 72 covers approximately everything except the inner region 634 of the side wall portion 62 and the inner surface of the base portion 61 on the front cover member 6, and is further configured such that the second portion 722 extends to the rear cover member 4. Note that the front cover sheet 72 can be adhered to the front cover member 6 using an adhesive such as a hot melt, double-sided tape, or the like.

2-1-5. Inner Cover Sheet

Next, the inner cover sheet 73 will be described with reference to FIGS. 23 and 24. The inner cover sheet 73 is made of a sheet made of resin, woven fabric, non-woven fabric, or the like. However, since the inner cover sheet 73 mainly comes into contact with the second main surface 102 of the game apparatus and can come into contact with the first main surface 101, the inner cover sheet 73 may be made of a soft material.

Figure 23:
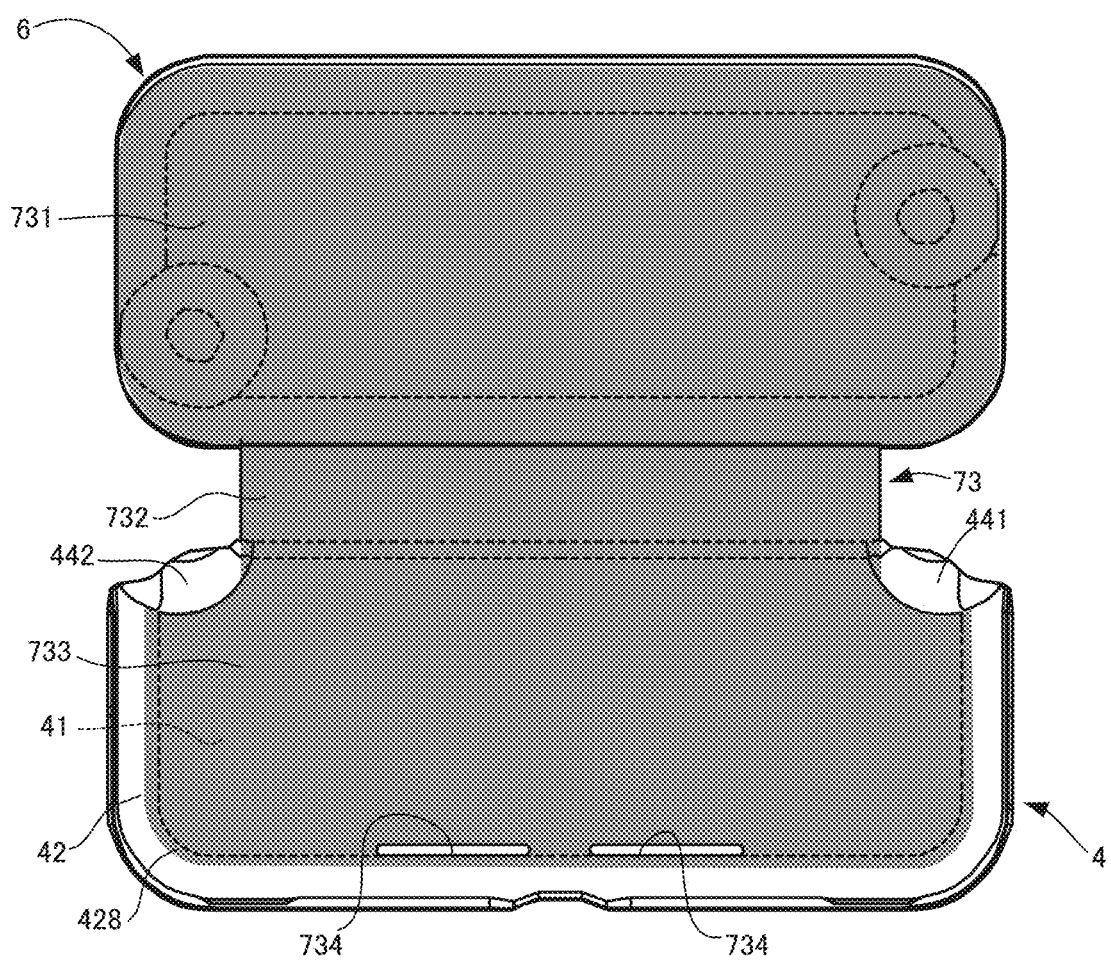
FIG. 23 is a plan view of inner surfaces of the rear cover member and the front cover member to which inner cover sheets are adhered.
Figure 24:
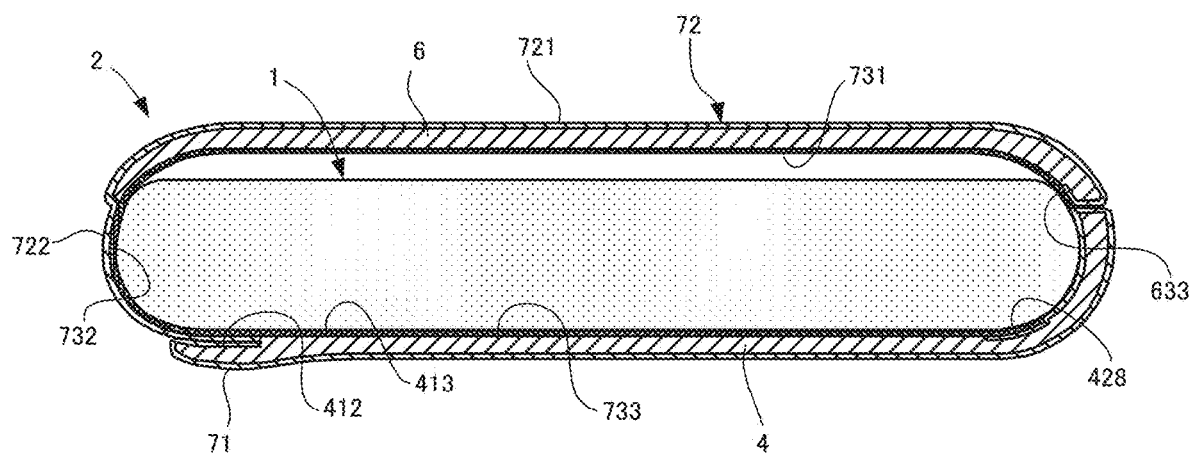
FIG. 24 is a cross-sectional view in which the cover in which the game apparatus is housed is in the closed state.

FIG. 23 is a plan view showing an inner cover adhered to the rear cover member and the front cover member, and FIG. 24 is a cross-sectional view of the cover in the closed state. Note that FIG. 23 does not show the front cover sheet 72 and the rear cover sheet 71. As shown in FIG. 23, the inner cover sheet 73 includes a front portion 731, an intermediate portion 732, and a rear portion 733, and is formed such that these portions are joined in one piece. The front portion 731 is formed so as to cover approximately the entire inner surface 601 of the front cover member 6. That is, the front portion 73 covers the front cover sheet 71 arranged on the thin portion 633. As described above, the front cover sheet 72 is stacked on the thin portion 633, whereby the level difference between the thin portion 633 and the end portion region 634 is filled in and made level. For this reason, as shown in FIG. 24, no level difference is formed at the front portion 731 of the inner sheet 73 adhered on the thin portion 633.

The intermediate portion 732 is formed into approximately the same shape as the second portion 722 of the front cover sheet 72, and covers the inner surface of the second portion 722. Also, the rear portion 733 is configured to cover the inner surface 401 of the base portion 41 of the rear cover member 4 and the first thing portion 428. As described above, the rear cover sheet 71 is stacked on the first thin portion 428, whereby the level difference between the first thin portion 428 and the inner region 413 is filled in and made level. Similarly, the rear cover sheet 71 and the front cover sheet 72 are stacked in the stated order on the second thin portion 412, whereby the level difference between the second thin portion 412 and the inner region 413 is filled in and made level. For this reason, as shown in FIG. 24, no level difference is formed at the rear portion 733 of the inner sheet 73 adhered on the second thin portion 412.

Due to the inner cover sheet 73 being adhered in this manner, the rear cover sheet 71 adhered to the end portion region 429 and the extended portions 441 and 442 of the side wall portion 42 of the rear cover member 4 is exposed. Also, through holes 734 are formed at positions corresponding to the through holes 411 of the rear cover member 6 on the rear portion 733. The thus-configured inner cover sheet can be adhered to the front cover member 6 using adhesive such as a hot melt, double-sided tape, or the like.

2-2. Cover Assembly Method

Next, a method for assembling the cover configured as described above will be described. In FIG. 24, first, the magnets 45 are fixed to the second and third rear notch portions 432 and 433 of the rear cover member 4 using adhesive. Next, as shown in FIG. 12, the rear cover sheet 71 is adhered to the rear cover member 4 using adhesive or the like. At this time, the rear cover sheet 71 is adhered so as to conform to the first notch portion 431 and the fourth notch portion 434 of the rear cover member 4. Note that since the magnets 45 are arranged in the second and third rear notch portions 432 and 433, the rear cover sheet 71 is adhered along the outer surfaces of the magnets 45. Accordingly, the magnets 45 are covered by the rear cover sheet 71 and cannot be seen from the outside. As described above, the rear cover sheet 71 is adhered to the other portions of the rear cover member 4.

Next, the magnets 65 are fixed to the first and second front notch portions 631 and 632 of the front cover member 6 using adhesive. Next, as shown in FIG. 20, the front cover sheet 72 is adhered to the front cover member 6 using adhesive or the like. At this time, since the magnets 65 are arranged in the first and second front notch portions 631 and 632, the front cover sheet 72 is adhered along the outer surfaces of the magnets 65. Accordingly, the magnets 65 are covered by the front cover sheet 72 and cannot be seen from the outside. As described above, the front cover portion 72 is adhered to the other portions of the front cover member 6. The second portion 722 extends to the outside from the end surface of the upper edge portion 621 on the side wall portion 62 of the front cover member 6. Note that the risk that the magnets 45 and 65 will be lost is suppressed due to the rear cover member 4 and the front cover member 6 being covered by the rear cover sheet 71 and the front cover sheet 72.

Next, the end portion of the second portion 722 is adhered to the second thin portion 412 of the rear cover member 4. Since the rear cover sheet 71 has already been adhered to the second thin portion 412, the second portion 722 is adhered on top of the rear cover sheet 71. Next, as shown in FIG. 23, the inner cover sheet 73 is adhered. As described above, the inner cover sheet 73 is adhered to the entire inner surface 601 of the front cover member 6, the inner surface of the second portion 722, and the base portion 41 and the first thin portion 428 of the rear cover member 4. At this time, the inner cover sheet 73 is adhered so as to cover the rear cover sheet 71 adhered to the first thin portion 428 of the rear cover member 4 and the front cover sheet 72 and the rear cover sheet 71 adhered to the second thin portion 412. Thus, as shown in FIG. 24, the cover 2 is completed.

2-3. Assembled Cover

Figure 25:
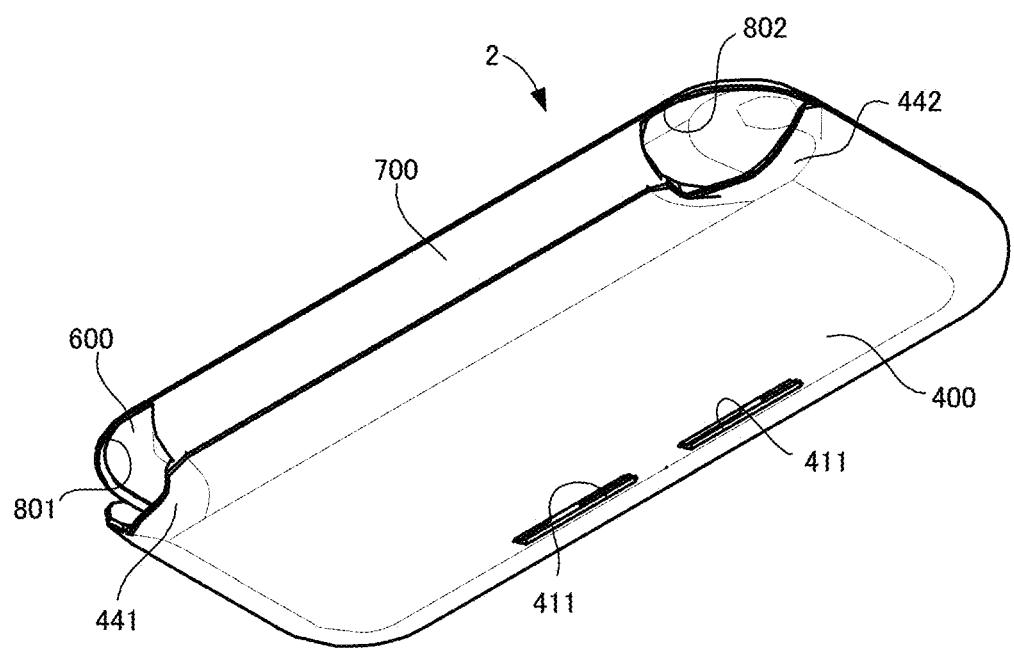
FIG. 25 is a perspective view showing the cover in the closed state as viewed from the rear side.

Next, the assembled cover will be described with reference to FIG. 25 as well. As shown in FIGS. 4 and 5, the cover 2 is constituted by a front cover 600, a rear cover 400, and a connection portion 700. The front cover 600 is constituted by the front cover member 6, and the portions of the front cover sheet 72 and the inner cover sheet 73 that cover the front cover member 6. The rear cover 400 is constituted by the rear cover member 4, and the portions of the rear cover sheet 71 and the inner cover sheet 73 that cover the rear cover member 4. Also, the connection portion 700 is constituted by a portion of the second portion 722 of the front cover sheet 72 that protrudes from the front cover member 6 and the rear cover member 4, and the inner cover sheet 73 that is adhered to this protruding portion.

Accordingly, the cover 2 is configured such that the connection portion 700 serves as a hinge and the front cover 600 and the rear cover 400 can be put in the closed state and the open state. In the closed state, the inner space in which the game apparatus 1 is housed is formed by the front cover 600, the rear cover 400, and the connection portion 700. Also, since the side wall portion is not provided at the portion at which the extended portions are provided in the rear cover, when the cover is assembled and put in the closed state as shown in FIG. 25, openings are formed on both sides of the connection portion. Also, the R button 50, the ZR button 51, the L button 38, and the ZL button 39 of the game apparatus 1 are exposed from these openings 801 and 802. More specifically, at least a portion of the button surfaces (in other words, the upper-side surfaces of the buttons) for performing a pressing operation on the R button 50, the ZR button 51, the L button 38, and the ZL button 39 is exposed.

Although the front cover 600 is constituted by the front cover member 6, the front cover sheet 72, and the inner cover sheet 73 as described above, the positions at which the front cover 600 is formed will be described as the positions of the front cover member 6, for the sake of convenience in the description. For example, in the front cover 600, the portion corresponding to the end surface 603 of the side wall portion 62 of the front cover member 6 will simply be referred to as the "end surface 603 of the front cover 600". The rear cover 400 is similar in this respect as well.

2-4. Method for Using Cover

Next, a method for using the cover will be described. First, the cover 2 is put in the open state. In order to put the cover 2 in the open state, the front cover 600 is pivoted away from the rear cover 400 using the connection portion 700 as a hinge. Since the connection portion 700 is formed by the front cover sheet 72 and the inner cover sheet 73, the connection portion 700 can be flexibly deformed. Accordingly, the front cover 600 can pivot approximately 360 degrees until coming into contact with the outer surface of the rear cover 400. Also, the connection portion 700 and the front cover 600 can be pivoted until the upper edge portion of the rear cover 400 is open.

Figure 26:
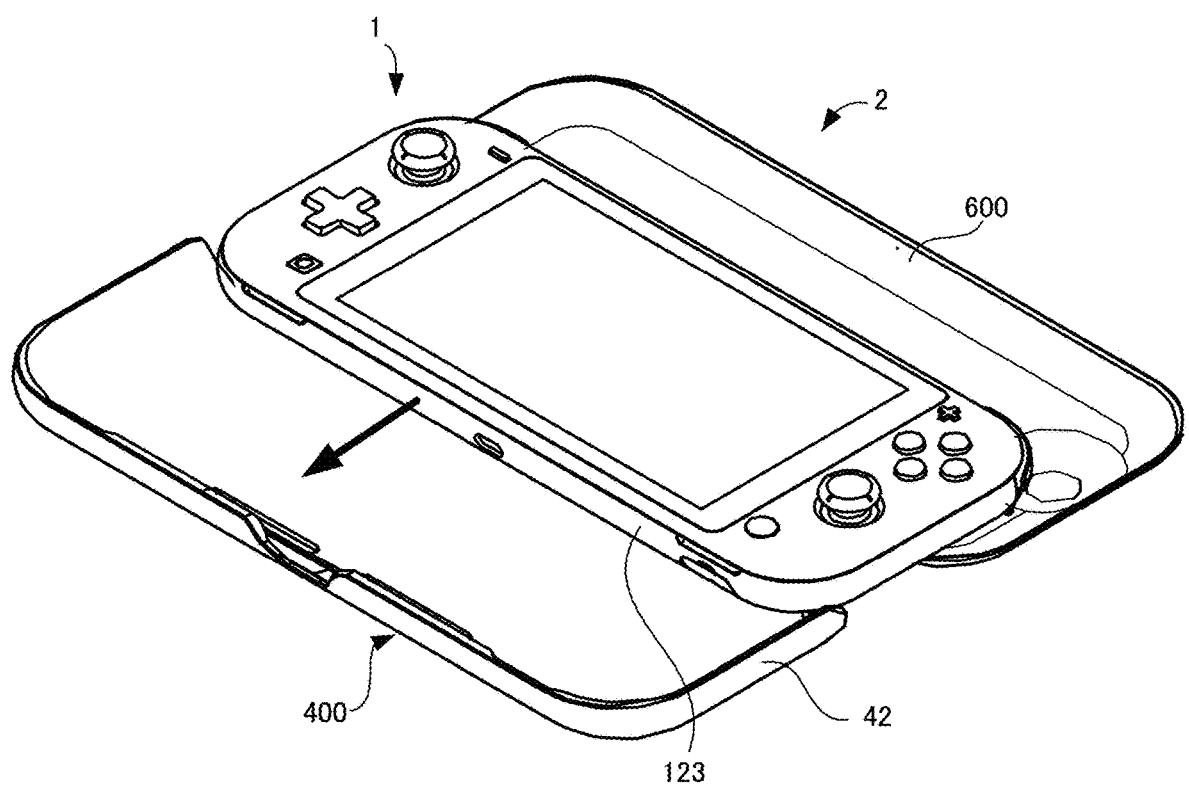
FIG. 26 is a perspective view for illustrating a method for using the cover.

Next, as shown in FIG. 26, the lower edge surface 123 of the game apparatus 1 is arranged at a position corresponding to the upper edge portion of the rear cover 400, and the game apparatus 1 is slid downward from this state. Accordingly, the surfaces of the peripheral edge surface 103 of the game apparatus 1 other than the upper edge surface 113, the upper-right corner surface 153, and the upper-left corner surface 163 come into contact with the side wall portion 42 of the rear cover 400, and as shown in FIG. 4, the game apparatus 1 is fixed to the rear cover 400. As described above, since the side wall portion 42 of the rear cover 400 functions as a retainer, the game apparatus 1 does not come out even if, for example, the rear cover 400 is turned over and the game apparatus 1 is faced downward. Note that since the side wall portion 42 is made of a resin material or the like and can elastically deform, if the game apparatus 1 is arranged on the end surface 403 of the side wall portion 42 and is pressed downward toward the base portion 41 in that state, the game apparatus 1 can be fit into the inner surface of the side wall portion 42 of the rear cover 400.

Thus, the front cover 600 is closed in a state in which the game apparatus 1 fixed to the rear cover 400. That is, due to the front cover 600 being pivoted and the end surface 603 of the front cover 600 and the end surface 403 of the rear cover 400 being stuck due to the magnets 45 and 65, the front cover 600 and the rear cover 400 are fixed. At this time, as shown in FIG. 27, the connection portion 700 covers at least a portion of the upper edge surface 113 of the peripheral edge surface 103 of the game apparatus 1, and therefore the R button 50, the L button 38, the ZR button 51, and the ZL button 39 are exposed to the outside from the openings 801 and 802 on both sides of the connection portion 700. Thus, the game apparatus 1 is housed in the cover 2. Also, when the cover 2 is placed on a placement surface T in this state, the extension portions 441 and 442 come into contact with the placement surface T, and the ZR button 51 and the ZL button 39 do not come into contact with the placement surface T, and therefore it is possible to suppress a case in which the buttons 39 and 51 receive a load. At this time, since the lower-side terminal 27 is exposed via the first rear notch portion 431, it is possible to connect a charger or the like to the lower-side terminal 27 and perform charging in the closed state.

Figure 28:
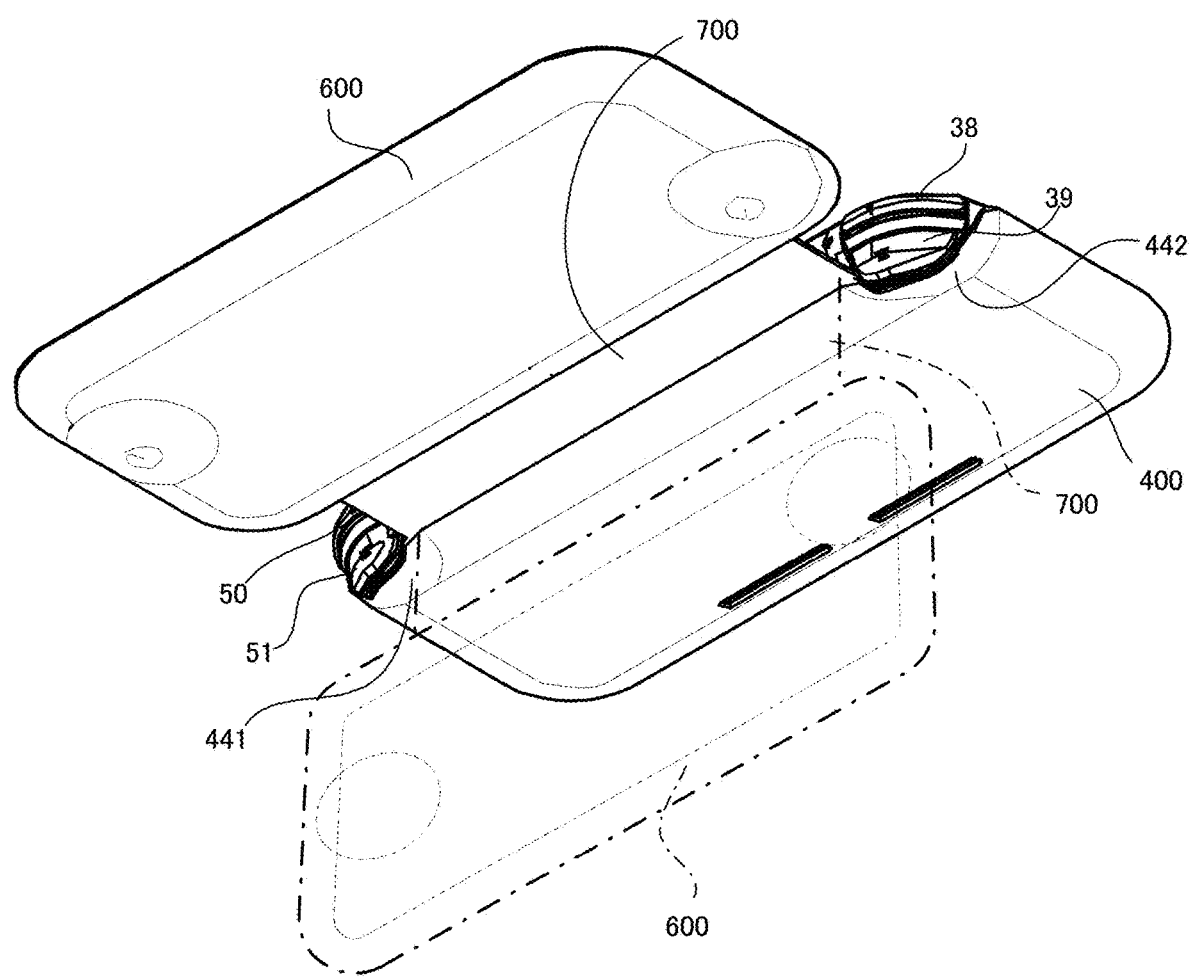
FIG. 28 is a perspective view for illustrating a method for using the cover.

Also, when the game apparatus 1 is used, the cover 2 is put in the open state. That is, the state in which the front cover 600 and the rear cover 400 are fixed is removed, and as shown in FIG. 28, the front cover 600 is pivoted via the connection portion 700 to a state of hanging down from the upper edge of the rear cover 400. Then, both sides of the cover 2 are gripped with both hands, and playing is per-formed. At this time, the first main surface 101 of the game apparatus 1 and the upper edge surface 113, the upper-right corner surface 153, and the upper-left corner surface 163 of the peripheral edge surface 103 are open to the outside, and therefore the buttons 38, 39, 50, and 51 arranged on these surfaces can be operated with fingers. Also, since the upper edge surface of the game apparatus 1 is also open to the outside, the slot 23, the audio input/output terminal 25, the power button 28, and the volume button 29 are exposed to the outside. Accordingly, operation of these buttons can also be performed.

Also, in the open state, the speaker holes 11*a* and 11*b* of the game apparatus 1 are also exposed to the outside via the fourth rear notch portions 434 of the rear cover 400, and therefore sounds emitted from the game apparatus 1 can be heard.

3. Characteristics

With the cover according to the present embodiment, the following effects can be obtained.

(1) Since the recessed portions 611 and 612 are formed on the inner surface of the front cover 600 so as to include positions corresponding to the joysticks 32 and 52, it is possible to suppress a case in which the front cover 600 comes into contact with the joysticks 32 and 52 in the closed state. Accordingly, it is possible to suppress a case in which a load acts on the joysticks 32 and 52. On the other hand, since the bulging portions are formed on the outer surface of the front cover 600 so as to include the positions on the side opposite to the recessed portions 611 and 612, the portions of outer surface of the front cover 600 other than the bulging portions 651 and 652 are closer to the first main surface 101 of the game apparatus 1 than the bulging portions 651 and 652. Thus, since only the positions at which the joysticks 32 and 52 are provided bulge, the front cover 600 can be made compact overall while avoiding a case in which unnecessary loads are applied to the joy sticks 32 and 52. That is, a cover 2 that fits the shape of the game apparatus 1 can be provided.

(2) The side wall portion 42 of the rear cover 400 engages with at least three locations, namely the lower edge surface 123 and the pair of side edge surfaces 133 and 143 of the peripheral edge surface 103 of the game apparatus 1, and therefore the game apparatus 1 can be fixed. In particular, since the lower edge surface 123 of the game apparatus 1 engages with the lower edge portion 421 of the side wall portion 42, for example, if playing is performed in a state in which the lower edge surface 123 of the game apparatus 1 is oriented downward in the vertical direction, it is possible to suppress a case in which the game apparatus 1 separates in a downward direction from the rear cover 400 during play. Furthermore, the connection portion 700 is arranged at a position covering the upper edge surface 113 of the game apparatus 1 in the closed state. Accordingly, it is possible to also suppress the game apparatus 1 from separating from the upper edge portion of the cover 2.

(3) Since the side wall portion 42 of the rear cover 400 is not provided on the upper edge portion and the side wall portion 42 functions as a frontward retainer, the game apparatus 1 can be attached to the rear cover 400 while being slid into the side wall portion 42 from above. Accordingly, it is easy to attach the game apparatus 1.

(4) When the cover 2 is put in the closed state, the end surfaces 403 and 603 of the front cover 600 and the rear cover 400 are fixed by the magnets 45 and 65, and therefore it is possible to make the cover 2 more compact. Also, since fixing is performed only with the magnets 45 and 65 in order to maintain the closed state of the two covers 400 and 600, the cover 2 can be put in the open state by merely opening the front cover 600. That is, since the cover 2 is put in the open state with only one operation, the operation is simple. Note that a configuration for holding the closed state other than magnets may also be provided, and in this case as well, the state of being fixed by at least magnets can be easily removed.

(5) Since the connection portion 700 is formed by the sheets 72 and 73, there is no restriction on the pivot angle of the front cover 600 when putting the front cover 600 in the closed state, and the front cover 600 can be pivoted to a state preferred by the user. Also, when the cover 2 is gripped with hands, when the cover 2 is put in the open state, the connection portion 700 enters a state of hanging down from the rear cover 400 due to the weight of the front cover 600. That is, the open state can be maintained naturally due to the weight of the front cover 600. Furthermore, since the connection portion 700 is formed by only the sheets 72 and 73 that cover the rear cover 400 and the front cover 600, an increase in the number of components can be suppressed.

(6) When the front cover 600 is open, the connection portion 700 also pivots away from the rear cover 400 at the same time, and therefore in the open state, the upper edge surface 113 of the game apparatus 1 can be exposed from the upper edge portion of the rear cover 400. For this reason, various interfaces on the upper edge surface 113 of the game apparatus 1 can be operated.

(7) Although the front cover sheet 72 and the rear cover sheet 71 that cover the front cover 600 and the rear cover 400 are not limited, for example, covering with a woven cloth is advantageous in that fingerprints are not noticeable. Also, the magnets 45 and 65 can be hidden by the cover sheets 71 and 72, and thus the external appearance can be improved. Furthermore, the effect of protecting the game apparatus can be improved by forming the inner cover sheet 73 with a sheet material that is softer than the cover sheets 71 and 72. Also, since the materials of the cover sheets 71 to 73, decorations attached to the front surface, design, and the like can be changed as appropriate, this makes it possible to easily change the design of the cover. Accordingly, it is possible to easily adapt to a required design of the cover 2 by merely changing only the cover sheets 71 to 73.

(8) Since the fourth notch portions 434 are formed at positions opposing the speaker holes 11a and 11b when the game apparatus 1 is housed, a case is suppressed in which the speaker holes 11a and 11b are closed, and the speaker holes 11a and 11b can be open to the outside. Accordingly, the sounds output from the speakers 11a and 11b can be made easier to hear. In particular, since the notch portions 434 are formed in circular shapes in cross-section, the sounds can flow smoothly. Furthermore, since the notch portions 434 are formed into circular arc shapes in cross-section and no sharp angles are formed in the notch portions 434, the notch portions 434 are advantageous in that the rear cover sheet 71 is easy to adhere thereto. Note that the fourth notch portions 434 are provided on the end surface 403 and the inner surface 401 of the lower edge portion 421, and therefore are not exposed to the outside in the closed state of the cover 2. Accordingly, in the closed state of the cover 2, a case in which the fourth notch portions 434 catch on another object is suppressed.

(9) Since the ZR button 51 and the ZL button 39 protrude rearward from the second main surface 102 of the game apparatus 1, if the front cover 600 is provided so as to cover these buttons 39 and 51 as well, for example, there is a risk that the front cover 600 will be more likely to catch on these buttons 39 and 51 when opened, and the front cover 600 will be more difficult to open. Also, although it is also conceivable to form the connection portion 700 with a greater length since interference with the buttons 39 and 51 is suppressed when the front cover 600 is opened, if the connection portion 700 is formed with a greater length, there is a risk that the front cover 600 will hang down considerably from the rear cover 400 in the open state, and will become a hindrance during operation of the game apparatus 1. In contrast to this, with the cover 2 according to the present embodiment, even in the closed state, the ZR button 51 and the ZL button 39 of the game apparatus 1 are not covered, and the openings 801 and 802 are formed to expose the buttons 39 and 51. More specifically, at least a portion of the button surfaces for performing a pressing operation on the ZR button 51 and the ZL button 39 is exposed without being covered by the cover 2 in the closed state as well. It is possible to suppress a case in which the front cover 600 interferes with the buttons 39 and 51, and the front cover 600 can be made easier to open. Also, there is no need to elongate the connection portion 700, and it is possible to suppress a case in which the operability of the game apparatus 1 deteriorates.

4. Modified Examples

Although an embodiment of the present disclosure was described above, the present disclosure is not limited to the above-described embodiments, and can be modified in various ways without departing from the gist of the disclosure. For example, the following modifications are possible. Also, the following modified examples can be combined as appropriate.

A. First Cover of the Present Disclosure (A-1) In the above-described embodiment, the recessed portions 611 and 612 are provided so as to cover the joysticks 32 and 52 that protrude from the first main surface 101 of the game apparatus 1, but the recessed portions may cover operation portions other than the joysticks 32 and 52. For example, if a button that protrudes higher than the various types of buttons (cross key 33, etc.) other than the joysticks 32 and 52, an operation portion that protrudes so as to be capable of being subjected not only to a pressing operation but also an operation in a lateral direction, and the like are provided on the first main surface 101 of the game apparatus 1, the recessed portions may also cover these portions.

In the above-described embodiment, the recessed portions 611 and 612 are formed into circular shapes in plan view, but they may have another shape, as long as it is a shape that covers the joystick. Similarly, the shapes of the bulging portions 651 and 652 need not be circular in plan view. In particular, the bulging portions 651 and 652 are formed on the outer surface 602 of the front cover member 6, and therefore a mold such as some sort of character may be used thereas. Also, the recessed portions 611 and 612 need not have shapes that cover the entireties of the joysticks 32 and 52, and it is sufficient that at least portions of the joysticks 32 and 52 are covered.

(A-2) In the above-described embodiment, although the pair of side edge portions 422 and 423 and the lower edge portion 421 of the side wall portion 42 of the rear cover 400 engage with the peripheral edge surface 103 of the game apparatus 1 and function as retainers, there is no limitation to this, and it is sufficient that a portion of the side wall portion 42 engages with the peripheral edge surface 103. For example, only the pair of side edge portions 422 and 423 may engage with the peripheral edge surface 103, and the lower edge portion 421 may merely come into contact with the peripheral edge surface 103. Note that in the above-described embodiment, the side wall portion 42 and the peripheral edge surface 103 are engaged due to the above-described retainer being formed on the side wall portion 42, but "engagement" in the present disclosure need not be retaining in which the peripheral edge surface 103 is suppressed from coming out in the front-rear direction, and it is sufficient to use a form in which the game apparatus 1 can be held in the side wall portion 42 while the side wall portion 42 is in contact with the peripheral edge surface 103. For example, it is sufficient that the game apparatus 1 can be held in the side wall portion 42 due to the side wall portion 42 pressing any portion of the peripheral edge surface 103. Also, for example, if the side edge portions 422 and 423 engage with the game apparatus 1, the entireties of the side edge portions 422 and 423 need not engage with the game apparatus 1, and portions of the side edge portions 422 and 423 may engage with the game apparatus 1. The case where the lower edge portion 421 engages is also the same in this respect.

(A-3) The side wall portion 42 of the rear cover 400 need not be formed continuously so as to conform to the peripheral edge surface 103 of the game apparatus 1, and for example, the side wall portion 42 may also be formed at a predetermined interval so as to include the lower edge portion, the right-side edge portion, and the left-side edge portion, which correspond to (face) at least portions of the lower edge surface 123, the right-side edge surface 133, and the left-side edge surface 143 of the game apparatus 1. The side wall portion 62 of the front cover 600 is also similar in this respect. The side wall portion 62 of the front cover 600 may also be provided only at a position corresponding to the position at which the side wall portion 42 of the rear cover 400 is provided. Furthermore, the upper edge portion 621 of the front cover 600 need not be provided.

Also, the side wall portions 42 and 62 of the covers 400 and 600 need not only be folded over at the side edges of the base portions 41 and 61 as in the above-described embodiment, and for example, the base portions 41 and 61 may also be formed larger than the main surfaces 101 and 102 of the game apparatus 1, and the side wall portions 42 and 62 may stand upright from the inside with respect to the peripheral edges of the base portions 41 and 61.

(A-4) Although the side wall portions 62 and 42 are provided on the front cover 600 and the rear cover 400 in the above-described embodiment, for example, the front cover 600 may be provided with only the base portion, with the side wall portion being provided on only the rear cover 400, and conversely, the rear cover 400 may be provided with only the base portion, with the side wall portion being provided only on the rear cover 600.

(A-5) In the above-described embodiment, the thin portions 412, 428, and 633 formed on the cover members 4 and 6 are for forming the level differences when the inner cover sheet 73 is adhered, and therefore various modifications are possible within that limitation. For example, the thin portions 412, 428, and 633 may also have a form in which the cover members 4 and 6 are not made thin, but the portions corresponding to the thin portions 412, 428, and 633 protrude outward on the outer surfaces of the cover members 4 and 6. The thin portions 412, 428, and 633 may be formed not only at the base portions 41 and 61 and the side wall portions 42 and 62, but also may be formed spanning over both the base portions and the side wall portions.

(A-6) In the above-described embodiment, the cover 2 is constituted by covering the rear cover member 4 and the front cover member 6 with the three cover sheets 71 to 73, but the form of the cover sheets is not particularly limited, and the shape, number, material, design, and the like of the cover sheets can be changed as appropriate. Also, the form for filling in the level differences of the thin portions and the like accordingly can also be changed as appropriate. Furthermore, the cover sheets 71 to 73 are not necessarily needed, and the cover 2 can also be constituted by only the cover members 4 and 6 and the connection portion 700 that connects the cover members 4 and 6. In this case, for example, the connection portion 700 may also be made of a resin material similar to that of the cover members 4 and 6, or a sheet material, and there is no particular limitation thereon.

(A-7) The inner surface 601 of the front cover 600 including the recessed portions 611 and 612 need not be completely spaced apart from the display 12, the joysticks 32 and 52, the various buttons (cross key 33, etc.), and the like of the first main surface 101 of the game apparatus 1, and may be slightly in contact with these elements.

(A-8) In the above-described embodiment, a configuration is used in which the end surfaces 403 and 603 of the covers 400 and 600 are brought into contact with each other and the closed state is held by the magnets 45 and 65, but the portions that come into contact in the closed state are not particularly limited thereto, and it is sufficient that any portions of the base portions 41 and 61 or the side wall portions 42 and 62 of the covers 400 and 600 come into contact with each other. Also, the configuration for holding the closed state is not particularly limited, and for example, another member can also be provided to fix the two covers 400 and 600.

(A-9) The form of the notch portions 434 corresponding to the speaker holes 11a and 11b is not particularly limited, and it is sufficient to use a form in which the notch portions 434 are provided at positions opposing the lower edge surface 123 and the speaker holes 11a and 11b are exposed to the outside via the notch portions 434. Also, the notch portions are not necessarily needed, and need not be provided. Alternatively, the speakers 11a and 11b may be exposed by raising the height of the side wall portion 42.

(A-10) The form of the extended portions 441 and 442 is not particularly limited, and it is sufficient that at least the portions of the protruding portions 34 and 35 of the game apparatus 1, which are portions that are provided extending from the base portion 41, are covered.

(A-11) In the above-described embodiment, the bulging portions 611 and 612 are formed at only the portions of the front cover 600 covering the joysticks 32 and 52. However, on the outer surface 602 of the front cover 600, portions other than the bulging portions 611 and 612 may bulge, a flat portion can be formed, and protrusions and recessions can be formed as appropriate. For example, protrusions and recessions may also be formed over the entire front cover 600 to match a mold such as a face of a character drawn on the outer surface of the front cover 600. At this time, for example, the eyes of the character are arranged at the portions corresponding to the joysticks 32 and 52, and these portions can be formed so as to protrude the most on the front cover 600.

(A-12) In the above-described embodiment, no hole is formed in the front cover 600, but at least one hole may be formed thereon, and a portion of the game apparatus 1 may be exposed from the holes in the closed state.

(A-13) In the above-described embodiment, the cover 2 was applied to the game apparatus 1, but the portable electronic device according to the present disclosure is not limited to a game apparatus and can be applied to various types of portable electronic devices such as a smartphone.

B. Second Cover of the Present Disclosure (B-1) In the above-described embodiment, the recessed portions 611 and 612 and the bulging portions 651 and 652 are provided on the front cover 600, but the configuration of the front cover 600 is not particularly limited, and protrusions and recession do not necessarily need to be provided thereon. That is, it is sufficient that at least the inner surface 601 of the front cover 600 is configured such that an unnecessary load is prevented from acting on the display 12, the joysticks 32 and 52, the buttons, and the like of the game apparatus 1.

(B-2) The extended portions 441 and 442 are not necessarily needed, and need not be provided. The openings 801 and 802 formed when the cover 2 is in the closed state are also not necessarily needed, and the ZL button 39 and the ZR button 51 may be covered by any of the front cover 600, the rear cover 400, and the connection portion 700. Alternatively, openings may be formed in advance on the upper-right corner portion and the upper-left corner portion of the rear cover 400, and the ZL button 39 and the ZR button 51 may be exposed through the openings. Furthermore, the front cover 600 and the rear cover 400 may be put in a state of not coming into contact even in the closed state, and the ZL button 39 and the ZR button 51 may be exposed from the gap between the front cover 600 and the rear cover 400.

(B-3) The second cover can also be applied to a game apparatus 1 that is not provided with operation means that protrude significantly such as the joysticks 32 and 52, the ZL button 39, and the ZR button 51.

(B-4) A-2, A-3, A-5, A-6, A-8, A-9, A-11, A-12, and A-13 described above can also be applied to the second cover of the present disclosure.

C. Third Cover of the Present Disclosure (C-1) A-2, A-3, A-4, A-5, A-6, A-8, A-9, A-10, A-11, A-12, A-13, and B-1 can also be applied to a third cover of the present disclosure.

(C-2) The third cover can also be applied to a game apparatus 1 that is not provided with operation means that protrude significantly such as the joysticks 32 and 52.

D. Fourth Cover of the Present Disclosure (D-1) In the above-described embodiment, the cover 2 is constituted by the rear cover member 4 and the front cover member 6 being covered by the three cover sheets 71 to 73, but the form of the cover sheets is not particularly limited, and the shape and number of the cover sheets can be changed as appropriate. For example, both the rear cover member 4 and the front cover member 6 can also be covered with at least one sheet that is in one piece. It is also possible to provide at least one inner surface sheet that covers the inner surfaces of the cover members 4 and 6 and at least one outer surface sheet that covers the outer surfaces of the cover members 4 and 6. In any case, the connection portion 700 can be formed by at least a portion of any sheet. Furthermore, the above-described sheet need not completely cover the cover members 4 and 6, and portions of the cover members 4 and 6 may be exposed. Also, the cover sheets may each be obtained by stacking multiple sheets. The form for filling in the level differences of the thin portions can also be changed as appropriate to match the form of the sheet, and it is also possible to not provide the thin portions.

(D-2) A-2, A-3, A-4, A-5, A-8, A-9, A-11, A-12, A-13, B-1, B-2, and B-3 described above can also be applied to the fourth cover of the present disclosure.

DESCRIPTION OF REFERENCE NUMERALS

1 Game apparatus (portable electronic device)
2 Cover
11*a*, 11*b* Speaker hole
101 First main surface
102 Second main surface
103 Peripheral edge portion
32, 52 Joystick
39 ZL button (operation portion)
51 ZR button (operation portion)
400 Rear cover
600 Front cover
700 Connection portion
4 Rear cover member
41 Base portion (first base portion)
42 Side wall portion (first side wall portion)
6 Front cover member
61 Base portion (second base portion)
62 Side wall portion (second side wall portion)

What is claimed is:

1. A cover for housing a portable electronic device that includes:
    a first main surface formed in a rectangular shape,
    a second main surface formed in a rectangular shape on a side opposite to the first main surface,
    a peripheral edge surface that joins peripheral edge portions of the first main surface and the second main surface and has an upper edge surface, a lower edge surface, and a pair of side edge surfaces,
    at least one joystick that protrudes from the first main surface,
    operation portions that are provided on portions of the upper edge surface toward the pair of side edge surfaces and protrude toward the second main surface, and
    protruding portions that protrude from the second main surface and are located on the lower edge surface sides of the operation portions,
    the cover comprising:
    a front cover for covering the first main surface;
    a rear cover for covering the second main surface; and
    a connection portion that connects the front cover and the rear cover,
    wherein the connection portion connects the front cover and the rear cover such that it is configured to enter a closed state in which the front cover is closed with respect to the rear cover so as to form an inner space in which the portable electronic device is housed, and an open state in which the front cover is open with respect to the rear cover,
    the front cover includes an inner surface that opposes the first main surface in the closed state, and an outer surface on a side opposite to the inner surface,
    the inner surface of the front cover includes a recessed portion that is formed at a position corresponding to the joystick so as to cover at least a portion of the joystick in the closed state,
    the outer surface of the front cover includes a bulging portion that is formed at a position on a side opposite to the recessed portion and bulges,
    the rear cover includes:
    a first base portion for covering the second main surface; and
    extended portions that extend from a peripheral edge of the first base portion and are for covering the protruding portions from the lower edge surface side, and
    in the closed state, openings through which the operation portions are exposed to the outside are formed between the front cover and the rear cover.

2. The cover according to claim 1, wherein
in the closed state, a gap is formed between the inner surface of the front cover and the first main surface.
3. The cover according to claim 1, wherein
the rear cover includes a first side wall portion, the first side wall portion stands upright from the peripheral edge of the first base portion, the first side wall portion is configured to contact at least portions of the lower edge surface and the pair of side edge surfaces on the peripheral edge surface of the portable electronic device,
at least a portion of the first side wall portion is configured to hold at least portions of the lower edge surface and the pair of side wall surfaces, and
in the closed state, the connection portion is arranged at a position covering the upper edge surface of the portable electronic device.
4. The cover according to claim 3, wherein
the front cover includes:
a second base portion for covering the first main surface of the portable electronic device; and
a second side wall portion that stands upright from a peripheral edge of the second base portion, and is for covering at least portions of the lower edge surface and the pair of side edge surfaces on the peripheral edge surface of the portable electronic device, and
in the closed state, a leading end surface of the first side wall portion of the rear cover and a leading end surface of the second side wall portion of the front cover come into contact with each other.
5. The cover according to claim 3, further comprising:
a notch portion in the first side wall of the rear cover, wherein the notch portion is disposed in a portion opposing the lower edge surface and where a speaker hole of the portable electronic device is located, and
the speaker hole is exposed to the outside in the open state by the notch portion.
6. The cover according to claim 3, wherein
the first side wall portion of the rear cover includes a pair of side edge portions that oppose the pair of side edge surfaces and a lower edge portion that opposes the lower edge surface, and the side edge portion is thinner than the lower edge portion, near the approximate center in the upright direction of the first side wall portion.
7. The cover according to claim 1, wherein
the front cover is thicker than the first base portion of the rear cover.
8. The cover according to claim 7, wherein
the front cover includes:
a second base portion for covering the first main surface of the portable electronic device; and
a second side wall portion that stands upright from a peripheral edge of the second base portion, and is for covering at least portions of the lower edge surface and the pair of side edge surfaces on the peripheral edge surface of the portable electronic device, and
the second base portion is thicker than the first base portion.
9. The cover according to claim 8, wherein
the extended portions protrude from the first base portion past leading end portions of the operation portions that protrude the most from the second main surface.

* * * * *